(12) United States Patent
Yamada et al.

(10) Patent No.: US 11,988,426 B2
(45) Date of Patent: May 21, 2024

(54) REFRIGERANT CHARGING METHOD

(71) Applicant: DAIKIN INDUSTRIES, LTD., Osaka (JP)

(72) Inventors: Takuro Yamada, Osaka (JP); Atsushi Yoshimi, Osaka (JP); Eiji Kumakura, Osaka (JP); Ikuhiro Iwata, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 437 days.

(21) Appl. No.: 17/280,619

(22) PCT Filed: Sep. 20, 2019

(86) PCT No.: PCT/JP2019/037049
§ 371 (c)(1),
(2) Date: Mar. 26, 2021

(87) PCT Pub. No.: WO2020/066922
PCT Pub. Date: Apr. 2, 2020

(65) Prior Publication Data
US 2021/0348816 A1    Nov. 11, 2021

(30) Foreign Application Priority Data

Sep. 28, 2018 (JP) ................................ 2018-184329
Sep. 28, 2018 (JP) ................................ 2018-184330
(Continued)

(51) Int. Cl.
*D21F 1/00*       (2006.01)
*F25B 13/00*    (2006.01)
(Continued)

(52) U.S. Cl.
CPC .............. *F25B 45/00* (2013.01); *F25B 13/00* (2013.01); *F25B 49/02* (2013.01); *F25B 40/00* (2013.01);
(Continued)

(58) Field of Classification Search
CPC .......... F05B 45/00; F05B 13/00; F05B 49/02; F05B 1/24; F05B 40/00; F05B 43/003;
(Continued)

(56) References Cited

U.S. PATENT DOCUMENTS 4,441,330 A * 4/1984 Lower ................... F25B 45/00
62/149
5,927,087 A    7/1999 Ishikawa
(Continued)

FOREIGN PATENT DOCUMENTS

CN    101691963 A    4/2010
CN    102032732 A    4/2011
(Continued)

OTHER PUBLICATIONS

International Search Report for PCT/JP2019/037049 dated Oct. 29, 2019.
(Continued)

*Primary Examiner* — Davis D Hwu
(74) *Attorney, Agent, or Firm* — Birch, Stewart, Kolasch & Birch, LLP

(57) ABSTRACT

Efficiency in refrigerant charging work is addressed when a recovered refrigerant recovered from a first heat source unit is to be charged to a second heat source unit. A refrigerant charging method is a charging method used when a first heat source unit of an already installed refrigeration cycle apparatus in which a refrigeration cycle is to be performed by a refrigerant that circulates is to be replaced with a second heat source unit. The refrigerant charging method includes recov-
(Continued)

ering a first refrigerant from an already installed refrigeration cycle apparatus and obtaining a recovered refrigerant and charging the recovered refrigerant and charging a second refrigerant whose composition differs from the composition of the recovered refrigerant to the refrigeration cycle apparatus after renewal that includes the second heat source unit.

20 Claims, 9 Drawing Sheets

(30) Foreign Application Priority Data

Sep. 28, 2018 (JP) ................................. 2018-184331
Sep. 28, 2018 (JP) ................................. 2018-184332

(51) Int. Cl.
*F25B 45/00* (2006.01)
*F25B 49/02* (2006.01)
*F25B 40/00* (2006.01)
*F25B 41/24* (2021.01)
*F25B 43/00* (2006.01)

(52) U.S. Cl.
CPC ............. *F25B 41/24* (2021.01); *F25B 43/003* (2013.01); *F25B 2313/0233* (2013.01); *F25B 2345/001* (2013.01); *F25B 2345/003* (2013.01); *F25B 2345/007* (2013.01); *F25B 2400/12* (2013.01); *F25B 2400/19* (2013.01); *F25B 2500/221* (2013.01); *F25B 2600/2513* (2013.01)

(58) Field of Classification Search
CPC ........ F05B 2313/0233; F05B 2345/003; F05B 2345/001; F05B 2345/007; F05B 2400/12; F05B 2400/19; F05B 2500/221; F05B 2600/2513
USPC ......................................................... 62/292
See application file for complete search history.

(56) References Cited

U.S. PATENT DOCUMENTS

| | | | |
|---|---|---|---|
| 6,035,648 | A | 3/2000 | Hickman et al. |
| 6,196,008 | B1 | 3/2001 | Fujitaka et al. |
| 6,425,252 | B1 | 7/2002 | Kobayashi et al. |
| 9,759,464 | B2 | 9/2017 | Sanhaji |
| 2003/0213256 | A1 | 11/2003 | Ueda et al. |
| 2004/0055317 | A1 | 3/2004 | Nomura et al. |
| 2005/0081606 | A1 | 4/2005 | Taira |
| 2008/0230738 | A1 | 9/2008 | Minor et al. |
| 2011/0219794 | A1 | 9/2011 | Shiba |
| 2012/0291457 | A1 | 11/2012 | Brown et al. |
| 2014/0216076 | A1 | 8/2014 | Yamashita |
| 2014/0260352 | A1 | 9/2014 | Murray |
| 2015/0159930 | A1 | 6/2015 | McMasters et al. |
| 2015/0338136 | A1 | 11/2015 | Suzuki |
| 2016/0084556 | A1 | 3/2016 | Kato et al. |
| 2016/0130490 | A1 | 5/2016 | Kujak et al. |
| 2018/0172329 | A1 | 6/2018 | Taira |
| 2019/0003755 | A1 | 1/2019 | Crombie et al. |

FOREIGN PATENT DOCUMENTS

| | | |
|---|---|---|
| CN | 104019525 A | 9/2014 |
| EP | 0 715 134 A2 | 6/1996 |
| EP | 0 789 199 A2 | 8/1997 |
| EP | 2 602 572 A1 | 6/2013 |
| EP | 2 698 585 A1 | 2/2014 |
| EP | 3 012 555 A1 | 4/2016 |
| JP | 63-129273 A | 6/1988 |
| JP | 2-157573 A | 6/1990 |
| JP | 4-273957 A | 9/1992 |
| JP | 6-341737 A | 12/1994 |
| JP | 8-121881 A | 5/1996 |
| JP | 8-145515 A | 6/1996 |
| JP | 8-296908 A | 11/1996 |
| JP | 8-303911 A | 11/1996 |
| JP | 8-327168 A | 12/1996 |
| JP | 9-72637 A | 3/1997 |
| JP | 9-113044 A | 5/1997 |
| JP | 9-217970 A | 8/1997 |
| JP | H10311625 A | * 11/1998 |
| JP | 11-173709 A | 7/1999 |
| JP | 11-201849 A | 7/1999 |
| JP | 2000-199660 A | 7/2000 |
| JP | 3360575 B2 | 12/2002 |
| JP | 2003-240388 A | 8/2003 |
| JP | 2004-12126 A | 1/2004 |
| JP | 2004-116875 A | 4/2004 |
| JP | 2004-116885 A | 4/2004 |
| JP | 2004-232951 A | 8/2004 |
| JP | 2005-127542 A | 5/2005 |
| JP | 2006-46446 A | 2/2006 |
| JP | 2006-207925 A | 8/2006 |
| JP | 2007-127325 A | 5/2007 |
| JP | 2008-202909 A | 9/2008 |
| JP | 2008-256254 A | 10/2008 |
| JP | 2009-222356 A | 10/2009 |
| JP | 2011-47556 A | 3/2011 |
| JP | 2011-94871 A | 5/2011 |
| JP | 2012-225525 A | 11/2012 |
| JP | WO 2013/111180 A1 | 8/2013 |
| JP | 2014-77594 A | 5/2014 |
| JP | 2014-202451 A | 10/2014 |
| JP | 2015-14372 A | 1/2015 |
| JP | 5934482 B2 | 6/2016 |
| JP | 2017-32185 A | 2/2017 |
| JP | 2017-67383 A | 4/2017 |
| JP | 2017-141998 A | 8/2017 |
| JP | 2017-215140 A | 12/2017 |
| JP | 2018-501334 A | 1/2018 |
| KR | 10-1727540 B1 | 4/2017 |
| WO | WO 2014/196045 A1 | 12/2014 |
| WO | WO 2014/203355 A1 | 12/2014 |
| WO | WO 2017/027716 A1 | 2/2017 |
| WO | WO 2018/146719 A1 | 8/2018 |

OTHER PUBLICATIONS

International Preliminary Report on Patentability and English translation of the Written Opinion of the International Searching Authority, for International Application No. PCT/JP2019/037049, dated Apr. 8, 2021.
Extended European Search Report for European Application No. 19865088.9, dated Oct. 11, 2021.
Extended European Search Report for European Application No. 19865862.7, dated Oct. 5, 2021.
Extended European Search Report for European Application No. 19867372.5. dated Oct. 11, 2021.
Extended European Search Report for European Application No. 19868034.0, dated Oct. 11, 2021.

* cited by examiner

REFRIGERANT CHARGING METHOD

TECHNICAL FIELD

The present disclosure relates to a refrigerant charging method for a refrigeration cycle apparatus in which a refrigeration cycle is to be performed by a refrigerant that circulates.

BACKGROUND ART

A refrigeration cycle apparatus including a refrigerant circuit in which a refrigeration cycle is to be performed is applied to an air conditioning apparatus, a boiler, and the like. As described in, for example, PTL 1 (Japanese Unexamined Patent Application Publication No. 2003-240388), for a refrigeration cycle apparatus, an already installed pipe may be utilized in charging of a refrigerant to the refrigeration cycle apparatus. In the refrigeration cycle apparatus described in PTL 1, for example, a liquid refrigerant is collected and recovered in an outdoor heat exchanger of a heat source unit through pump down operation. Usually, the refrigerant recovered from the refrigerant cycle apparatus is carried to a factory and discarded or carried to a factory and regenerated.

SUMMARY OF INVENTION

Technical Problem

Taking a refrigerant recovered from an already installed refrigeration cycle apparatus back to a factory and regenerating the refrigerant, however, require transporting the recovered refrigerant from a location where the already installed refrigeration cycle apparatus is present to the factory. In addition, the refrigerant regenerated in the factory is required to be transported from the factory to a location where a refrigeration cycle apparatus that is an object of refrigerant charging is present.

Regeneration utilization in which a refrigerant is thus taken back to a factory and regenerated has a problem that efficiency in refrigerant charging work is degraded.

Solution to Problem

A refrigerant charging method according to a first aspect is a refrigerant charging method of recovering a refrigerant to charge the refrigerant to a second heat source unit, the refrigerant being included in a first heat source unit of an already installed refrigeration cycle apparatus in which a refrigeration cycle is to be performed by the refrigerant that circulates, and charging the refrigerant to the second heat source unit, the method including a step of recovering a first refrigerant from the already installed refrigeration cycle apparatus and obtaining a recovered refrigerant, and a step of charging the recovered refrigerant and further charging a second refrigerant whose composition differs from a composition of the recovered refrigerant to the refrigeration cycle apparatus that includes the second heat source unit.

In the refrigerant charging method according to the first aspect, it is possible to address efficiency in charging work for the second heat source unit by charging the recovered refrigerant and further charging the second refrigerant to the refrigeration cycle apparatus including the second heat source unit. The refrigerant that is recovered and charged means a refrigerant that is recovered from the first heat source unit.

A refrigerant charging method according to a second aspect is the refrigerant charging method according to the first aspect in which the first refrigerant is an R410A refrigerant, and the second refrigerant is an R32 refrigerant.

In the refrigerant charging method according to the second aspect, the first refrigerant is the R410A refrigerant and the second refrigerant is the R32 refrigerant; therefore, parts of the already installed refrigeration cycle apparatus, which has been operated with the R410A refrigerant, other than the heat source unit are compatible with the R410A refrigerant. Accordingly, even when the R32 refrigerant, which is the second refrigerant, is supplemented, the refrigerant is still the mixed refrigerant of R125 and R32, as with the R410A refrigerant, although the ratio of the components of the mixed refrigerant of the recovered refrigerant and the second refrigerant changes, and the operation of the refrigeration cycle apparatus is easily kept normal since the parts of the already installed refrigeration cycle apparatus other than the heat source unit are suitable for the refrigerant compared with when the second refrigerant other than R125 and R32 is completed with respect to the R410A refrigerant.

A refrigerant charging method according to a third aspect is the refrigerant charging method according to the first aspect in which the first refrigerant is an R410AB refrigerant, and the second refrigerant is an R452B refrigerant.

In the refrigerant charging method according to the third aspect, the first refrigerant is the R410A refrigerant and the second refrigerant is the R452B refrigerant; therefore, the parts of the already installed refrigeration cycle apparatus, which has been operated with the R410A refrigerant, other than the heat source unit are compatible with the R410A refrigerant. Accordingly, even when the R452B refrigerant, which is an alternative refrigerant of the R410A refrigerant, is supplemented, the refrigerant is still the mixed refrigerant including difluoromethane and pentafluoroethane, as with the R410A refrigerant, although the ratio of the components of the mixed refrigerant of the recovered refrigerant and the second refrigerant changes, and the operation of the refrigeration cycle apparatus is easily kept normal since the parts of the already installed refrigeration cycle apparatus other than the heat source unit are suitable for the refrigerant compared with when the second refrigerant that does not include difluoromethane and pentafluoroethane is completed with respect to R410A.

A refrigerant charging method according to a fourth aspect is the refrigerant charging method according to the first aspect in which the first refrigerant is an R410A refrigerant, and the second refrigerant is an R454B refrigerant.

In the refrigerant charging method according to the fourth aspect, the first refrigerant is the R410A refrigerant and the second refrigerant is the R454B refrigerant; therefore, parts of the already installed refrigeration cycle apparatus, which has been operated with the R410A refrigerant, other than the heat source unit are compatible with the R410A refrigerant. Accordingly, even when the R454B refrigerant, which is an alternative refrigerant of the R410A refrigerant, is completed, the refrigerant is still the mixed refrigerant including difluoromethane and pentafluoroethane, as with the R410A refrigerant, although the ratio of the components of the mixed refrigerant of the recovered refrigerant and the second refrigerant changes, and the operation of the refrigeration cycle apparatus is easily kept normal since the parts of the already installed refrigeration cycle apparatus other than the heat source unit are suitable for the refrigerant compared with when the second refrigerant that does not include difluoromethane and pentafluoroethane is completed with respect to R410A.

A refrigerant charging method according to a fifth aspect is the refrigerant charging method according to any of the first aspect to the fourth aspect, the method further including a step of, after packing a nitrogen gas in the second heat source unit, transporting the second heat source unit with the nitrogen gas packed in the second heat source unit to an installation location of the already installed refrigeration cycle apparatus.

In the refrigerant charging method according to the fifth aspect, the nitrogen gas is packed in the second heat source unit that is transported to the installation location; therefore, outside air is obstructed by the nitrogen gas from entering the second heat source unit during transport, and it is thus possible to suppress a foreign material, moisture, and the like from mixing with outside air and entering the second heat source unit during transport.

A refrigerant charging method according to a sixth aspect is the refrigerant charging method according to any of the first aspect to the fourth aspect, the method further including a step of, after packing an R32 in a prescribed pressure range in the second heat source unit, transporting the second heat source unit with the R32 packed in the second heat source unit to an installation location of the already installed refrigeration cycle apparatus.

In the refrigerant charging method according to the sixth aspect, the R32 refrigerant is packed in the second heat source unit that is transported to the installation location; therefore, outside air is obstructed by the R32 refrigerant from entering the heat source unit during transport, and it is thus possible to suppress a foreign material, moisture, and the like from mixing with outside air and entering the second heat source unit during transport. Moreover, there is no need to extract the R32 refrigerant when connecting the second heat source unit to the already installed refrigeration cycle apparatus, and therefore, time and labor in charging work are saved.

A refrigerant charging method according to a seventh aspect is the refrigerant charging method according to any of the first aspect to the sixth aspect, the method further including a step of, when the recovered refrigerant and the second refrigerant are mixed together through charging to the refrigeration cycle apparatus including the second heat source unit and become a mixed refrigerant, judging whether the mixed refrigerant is non-flammable and/or judging whether the mixed refrigerant is flammable.

In the refrigerant charging method according to the seventh aspect, the mixed refrigerant in which the recovered refrigerant and the second refrigerant are mixed is judged to be non-flammable and/or judged to be flammable. When the refrigeration cycle apparatus that includes the second heat source unit is only compatible with a non-flammable refrigerant or not compatible with a flammable refrigerant, it is possible to take a measure of selecting non-utilization of the mixed refrigerant for the refrigeration cycle apparatus or modifying the refrigeration cycle apparatus so as to be, for example, compatible with a flammable refrigerant, and it is possible to keep the operation of the refrigeration cycle apparatus normal.

A refrigerant charging method according to an eighth aspect is the refrigerant charging method according to any of the first aspect to the seventh aspect, the method including a step of causing the second heat source unit to store a mixture ratio of the recovered refrigerant and the second refrigerant charged in the second heat source unit and/or causing the second heat source unit to display the mixture ratio.

In the refrigerant charging method according to the eighth aspect, it is possible to correctly grasp the composition of the refrigerant of the second heat source unit from the stored and/or displayed mixture ratio, and it is thus possible to operate the refrigeration cycle apparatus normally on the basis of the grasped composition of the refrigerant.

DESCRIPTION OF EMBODIMENTS (1) Overall Configuration

Figure 1:
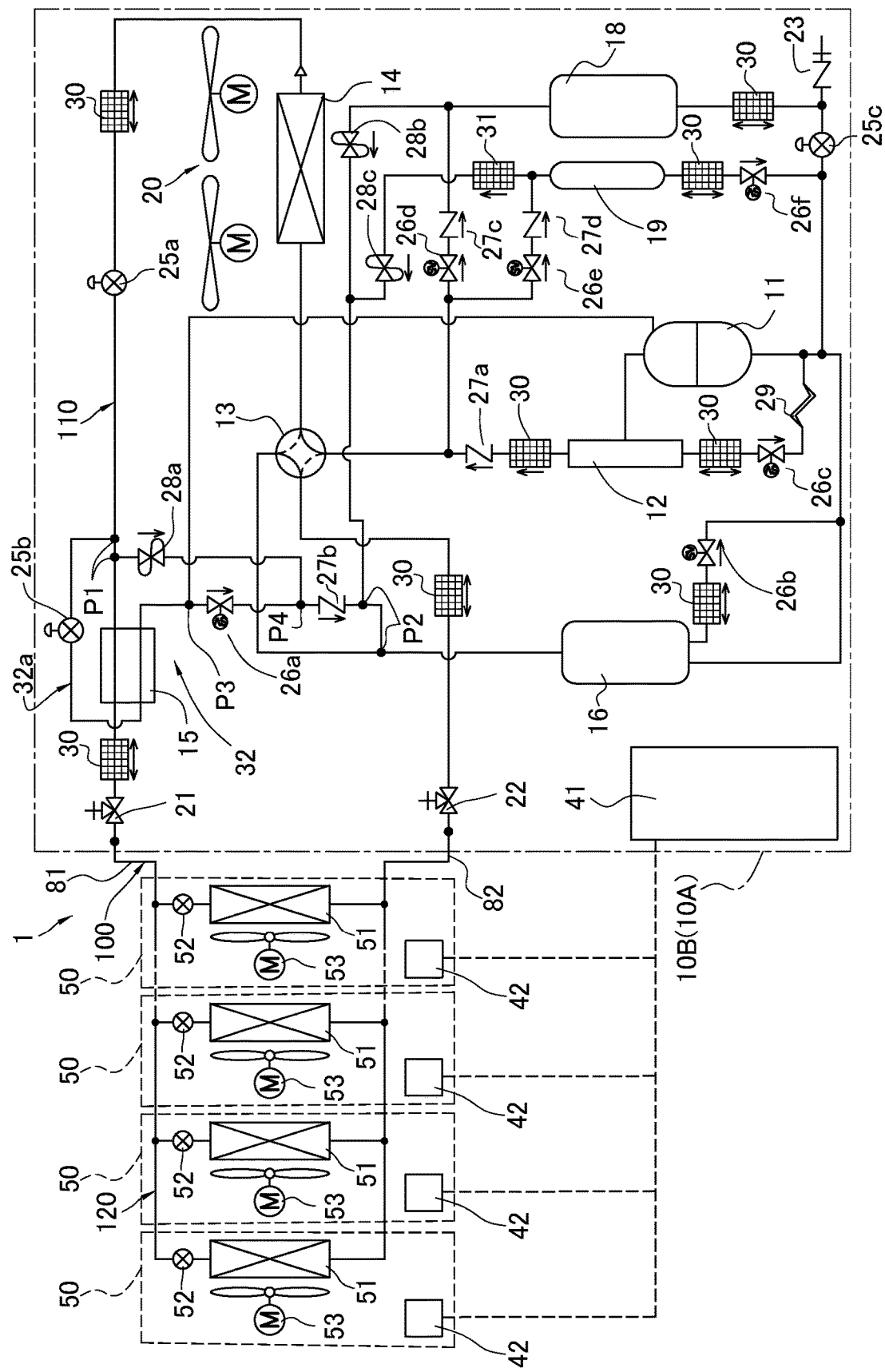
FIG. 1 is a refrigerant circuit diagram illustrating an outline of the configuration of a refrigeration cycle apparatus according to an embodiment.

In FIG. 1, an example of the configuration of a refrigeration cycle apparatus that is an object of a refrigerant charging method is illustrated. A refrigeration cycle apparatus 1 illustrated in FIG. 1 is an apparatus in which a refrigeration cycle is to be performed by a refrigerant that circulates in a refrigerant circuit 100. The refrigeration cycle apparatus 1 repeats a cycle of compression of the refrigerant, heat radiation from the refrigerant, decompression expansion of the refrigerant, and heat absorption into the refrigerant. The refrigeration cycle apparatus 1 includes a first heat source unit 10A or a second heat source unit 10B switchable to have a function of heat radiation or to have a function of heat absorption in the refrigeration cycle, and a utilization unit 50 connected to the first heat source unit 10A or the second heat source unit 10B. Here, the first heat source unit 10A is a heat source unit before renewal, and the second heat source unit 10B is a heat source unit after renewal.

A case in which the refrigeration cycle apparatus 1 after renewal includes the second heat source unit 10B is presented as an example and described here. However, a case in which a refrigerant recovered from the first heat source unit 10A of the already installed refrigeration cycle apparatus 1 is to be charged to the second heat source unit 10B is not limited to such a case of renewal of the refrigeration cycle apparatus 1. For example, the second heat source unit 10B may be included in another refrigeration cycle apparatus of a building adjacent to a building at which the refrigeration cycle apparatus 1 is installed. A refrigerant to be recovered and charged means a refrigerant that is recovered from the first heat source unit 10A.

The utilization unit 50 cools an object by utilizing heat absorption of the refrigerant when the first heat source unit 10A or the second heat source unit 10B is a heat source whose heat is radiated from the refrigerant. The utilization unit 50 heats an object by utilizing heat radiation of the refrigerant when the first heat source unit 10A or the second heat source unit 10B is a heat source whose heat is absorbed by the refrigerant.

The refrigeration cycle apparatus 1 is applicable to an air conditioning apparatus that performs cooling and heating. In this case, for example, the first heat source unit 10A or the second heat source unit 10B serves as an outdoor unit of the air conditioning apparatus, and the utilization unit 50 serves as an indoor unit of the air conditioning apparatus. The utilization unit 50 that is the indoor unit cools or heats air in an air-conditioning object space to perform cooling or heating. Note that, although a case in which the refrigeration cycle apparatus 1 is applied to an air conditioning apparatus is presented as an example and described here, the refrigeration cycle apparatus is also applicable to other apparatuses and applicable to, for example, a heat pump-type hot water supply apparatus, a refrigerator, and a cooling apparatus that cools inside a chamber.

Figure 2:
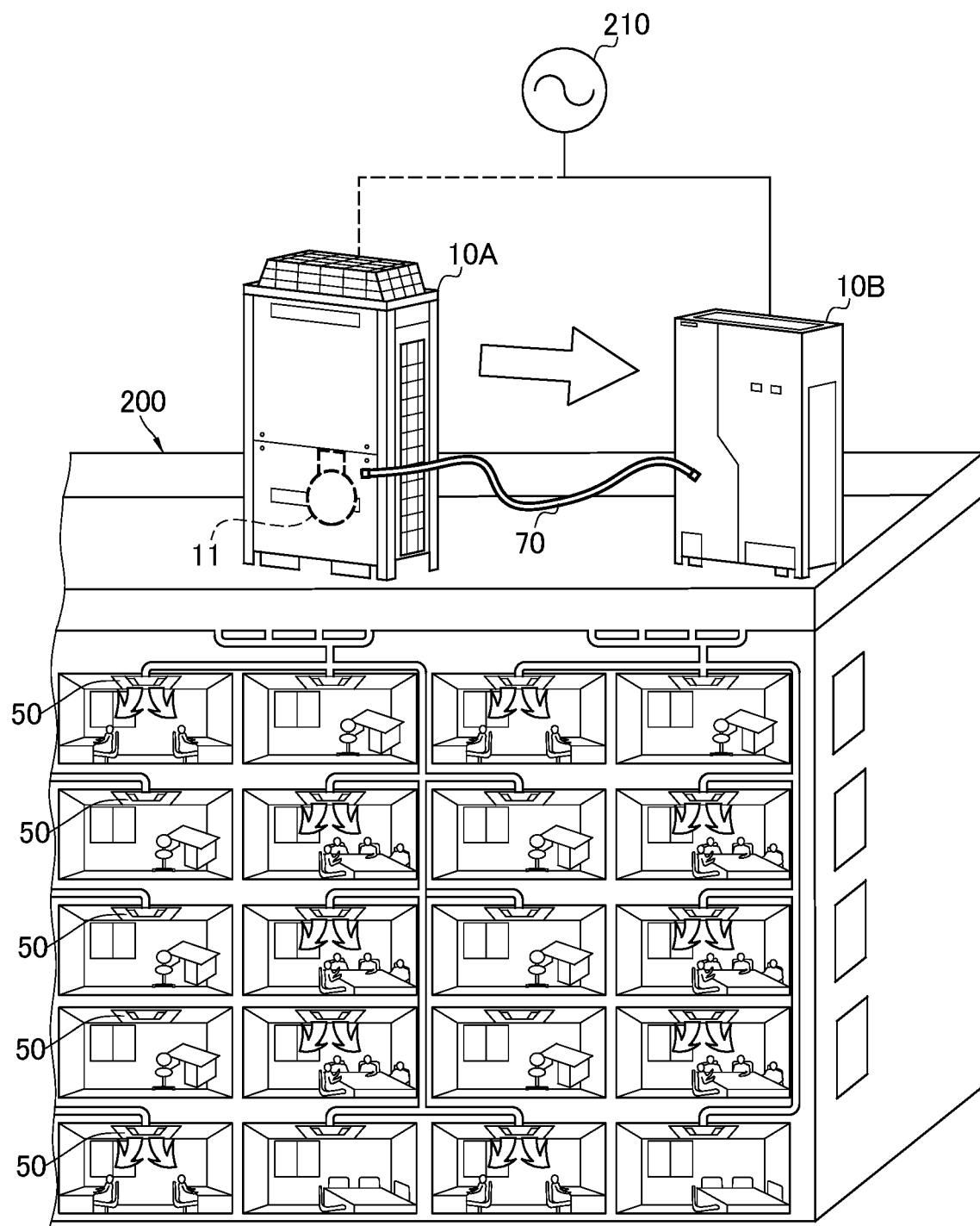
FIG. 2 is a schematic diagram for describing transfer of a refrigerant from a first heat source unit to a second heat source unit.
Figure 3:
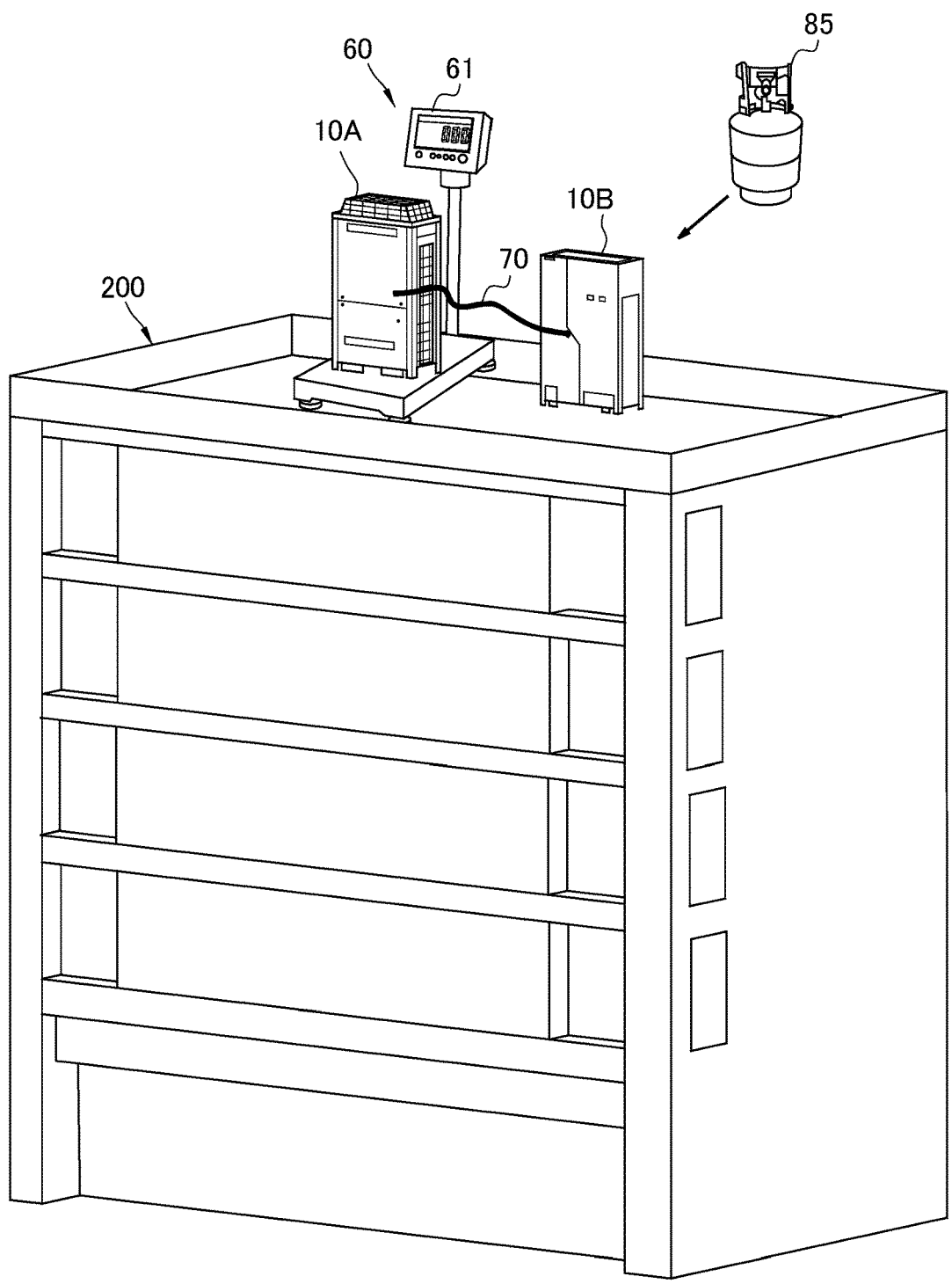
FIG. 3 is a schematic diagram for describing measurement of the weight of a refrigerant transferred from the first heat source unit to the second heat source unit.

In FIG. 2 and FIG. 3, regarding a case in which the refrigeration cycle apparatus 1 is an air conditioning apparatus, an example in which the refrigeration cycle apparatus 1 is installed at a building 200 is illustrated. In the example illustrated in FIG. 2, the first heat source unit 10A or the second heat source unit 10B is installed at the rooftop of the building 200. As illustrated in FIG. 2, a plurality of utilization units 50 are installed in respective rooms to perform air conditioning of each room in the building 200.

In FIG. 2 and FIG. 3, the first heat source unit 10A before renewal included in the already installed refrigeration cycle apparatus 1 and the second heat source unit 10B that is planned to be included in the refrigeration cycle apparatus 1 after renewal are illustrated. In other words, the first heat source unit 10A is an old heat source unit, and the second heat source unit 10B is a new heat source unit. The already installed refrigeration cycle apparatus 1 has already been installed at the building 200 and has an experience of performing a refrigeration cycle by circulating a refrigerant before renewal. The refrigerant is present in each of the first heat source unit 10A and the plurality of utilization units 50 included in the refrigeration cycle apparatus 1. Here, a refrigerant that is included in the inner portion of the refrigeration cycle apparatus 1 for the purpose of circulating in the refrigerant circuit 100 is referred to as a circulating refrigerant.

As described in the flowchart in FIG. 4, the refrigerant charging method, which will be described below, for the above-described refrigeration cycle apparatus 1 is configured to include a step S3 of recovering a first refrigerant from the already installed refrigeration cycle apparatus 1 and obtain a recovered refrigerant, and a step S5 of charging the recovered refrigerant and charging a second refrigerant whose composition differs from that of the recovered refrigerant to the refrigeration cycle apparatus 1 after renewal including the second heat source unit 10B.

In the following description of an embodiment, a case in which the first refrigerant is an R410A refrigerant and the second refrigerant is an R32 refrigerant is presented as example and described. The first refrigerant is the R410A refrigerant and is a mixed refrigerant of difluoromethane and pentafluoroethane, and the recovered refrigerant is also a mixed refrigerant, as with the R410A refrigerant.

A long period of use of the R410A refrigerant in the already installed refrigeration cycle apparatus 1 may change the mixture ratio of difluoromethane and pentafluoroethane with a lapse of time. The range of the change in the mixture ratio of difluoromethane and pentafluoroethane can be estimated, although including errors, through an experiment, a simulation, or the like. The already installed refrigeration cycle apparatus 1 in which the first heat source unit 10A is incorporated has an allowable range in which operation is possible even when the mixture ratio of difluoromethane and pentafluoroethane occupying the circulating refrigerant changes from that in the initial R410A refrigerant. Similarly, the refrigeration cycle apparatus 1 after renewal including the second heat source unit 10B also has an allowable range regarding the mixture ratio of difluoromethane and pentafluoroethane so as to be able to operate even when the mixture ratio of difluoromethane and pentafluoroethane is not the same, which is 1:1, as that in the R410A.

Accordingly, the refrigeration cycle apparatus 1 after renewal operates normally if the mixture ratio of difluoromethane and pentafluoroethane of the circulating refrigerant after the addition of the R32 refrigerant to the recovered refrigerant is within the allowable range of the refrigeration cycle apparatus 1 after renewal. The R32 refrigerant to be added is housed in a cylinder 85 illustrated in FIG. 3.

Figure 4:
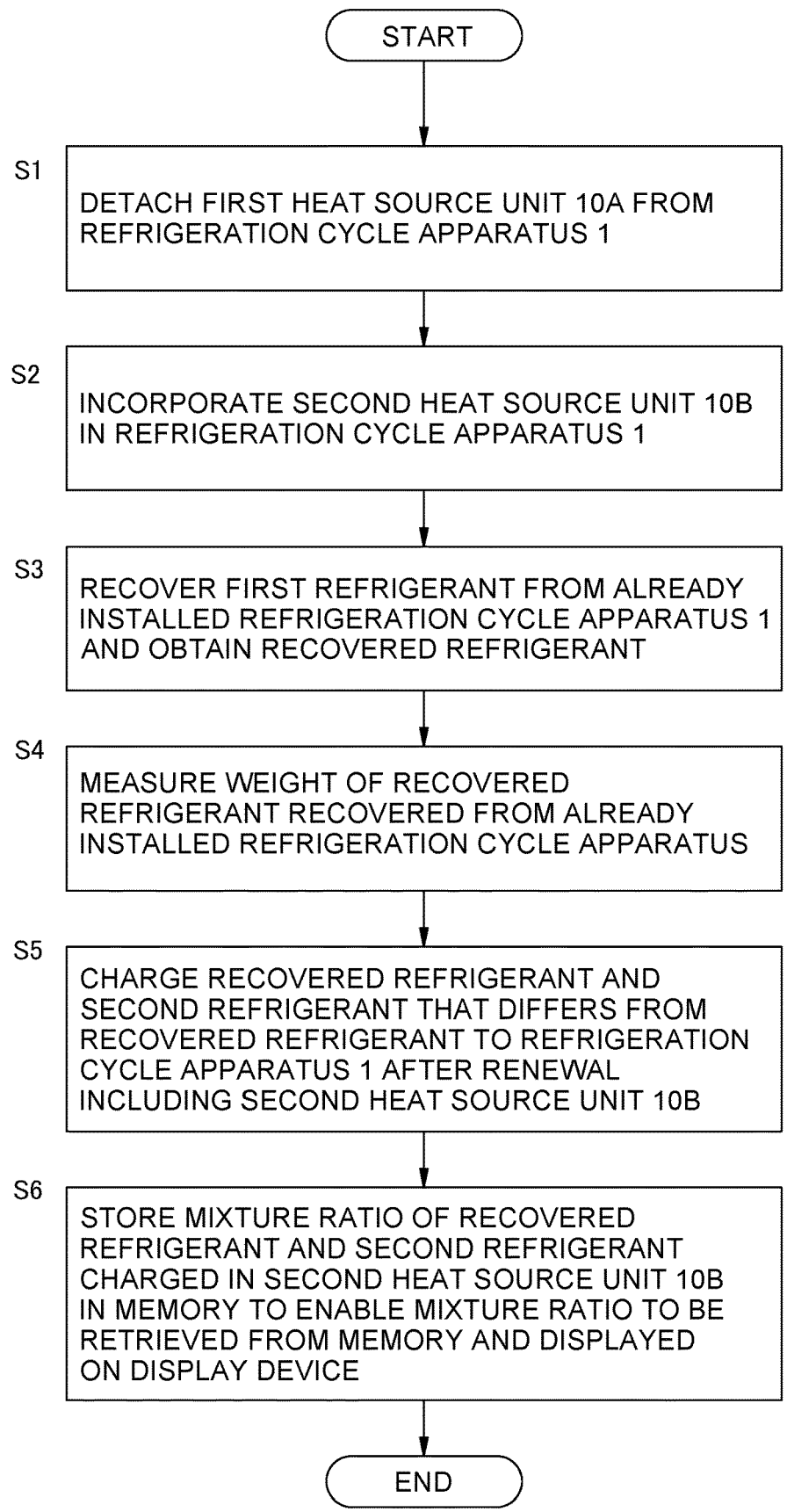
FIG. 4 is a flowchart illustrating an outline of a flow of a refrigerant charging method.

As illustrated in FIG. 4, in a state in which the circulating refrigerant of the refrigeration cycle apparatus 1 has been transferred to the first heat source unit 10A through pump down operation, the first heat source unit 10A is first detached from the refrigeration cycle apparatus 1 (step S1). When the first heat source unit 10A is to be detached, a high-pressure-side shutoff valve 21 and a low-pressure-side shutoff valve 22 of the first heat source unit 10A are closed.

Next, the second heat source unit 10B is incorporated in the refrigeration cycle apparatus 1 (step S2). With respect to the refrigeration cycle apparatus 1 after renewal in which the second heat source unit 10B is incorporated, for example, airtightness of the refrigeration cycle apparatus 1 is inspected, and, after the airtightness of the refrigeration cycle apparatus 1 is confirmed, the refrigeration cycle apparatus 1 is evacuated by a vacuum pump.

In FIG. 2, a state in which a refrigerant is transferred from the first heat source unit 10A to the second heat source unit 10B is schematically illustrated. In a state of being incorporated in the refrigeration cycle apparatus 1 that is after renewal, the second heat source unit 10B is connected to a power source 210 and in an operable state. The first heat source unit 10A and the second heat source unit 10B are connected to each other by a charge hose 70. In response to the operation of the second heat source unit 10B, the first refrigerant (R410A refrigerant) is transferred from the first heat source unit 10A through the charge hose 70 to the second heat source unit 10B. Through this transfer of the refrigerant from the first heat source unit 10A to the second heat source unit 10B, a recovered refrigerant is obtained (step S3). At this time, the first heat source unit 10A is, for example, in a state of being temporarily placed at the rooftop of the building 200 and is not connected to the power source 210.

In FIG. 3, a state in which the weight of the recovered refrigerant recovered in the second heat source unit 10B from the first heat source unit 10A is measured is illustrated. The weight of the first heat source unit 10A is measured by a scale 61. The scale 61 measures the recovered refrigerant recovered from the first heat source unit 10A by measuring the weight of the first heat source unit 10A both of before the recovered refrigerant is transferred from the first heat source unit 10A and after the recovered refrigerant is transferred from the first heat source unit 10A. The weight of the recovered refrigerant can be calculated by subtracting a measured value obtained by the scale 61 regarding the first heat source unit 10A that is before transfer of the recovered refrigerant from the first heat source unit 10A from a measured value obtained by the scale 61 regarding the first heat source unit 10A that is after transfer of the recovered refrigerant from the first heat source unit 10A (step S4).

As a result of the second heat source unit 10B to which the recovered refrigerant has been transferred being incorporated in the refrigeration cycle apparatus 1, transfer of the recovered refrigerant to the refrigeration cycle apparatus 1 is completed. Then, the second refrigerant is charged to the refrigeration cycle apparatus 1 in which the recovered refrigerant has been transferred (step S5). The gross weight of the refrigerants proper for the refrigeration cycle apparatus 1 after renewal in which the second heat source unit 10B is incorporated can be previously calculated by using data of the already installed refrigeration cycle apparatus 1 in which the first heat source unit 10A is incorporated. It is possible to obtain the weight of a lacking refrigerant and to determine the charge amount of the R32 refrigerant, which is the second refrigerant, by subtracting the weight of the recovered refrigerant measured by a measurement system 60 in the step S4 from the gross weight of the refrigerants proper for the refrigeration cycle apparatus 1 after renewal. When the gross weight of the refrigerants proper for the refrigeration cycle apparatus 1 after renewal is set in a prescribed range, calculation may be performed by using, for example, a median value of the prescribed range.

The refrigerant charging work from the step S1 to the step S5 described above is performed at, for example, a local site. Here, performing the refrigerant charging work from the step S1 to the step S5 at a local site means that the recovered refrigerant is not taken back to facilities, such as a factory, and the recovered refrigerant as it is or treated at the installation location of the refrigeration cycle apparatus 1 is recharged to the refrigeration cycle apparatus 1 after renewal. In the above-described case, the work from the step S1 to the step S5 is performed, for example, at the rooftop of the building 200. When the refrigerant charging work from the step S1 to the step S5 is to be performed at a local site, the refrigerant charging work is preferably performed within one day and is more preferably performed during the daytime of one day. This is because an environmental change is small, a work object is easily visually recognized, and refrigerant leakage and mixing of a foreign material into the refrigeration cycle apparatus 1 are easily prevented. The work in the step S6 illustrated in FIG. 4 will be described later in detail after describing a control system 40 (refer to FIG. 9).

(2) Detailed Configuration (2-1) Configuration of Refrigeration Cycle Apparatus 1

In the refrigeration cycle apparatus 1 illustrated in FIG. 1, one first heat source unit 10A or one second heat source unit 10B and a plurality of the utilization units 50 are connected by connection pipes 81 and 82. In the refrigeration cycle apparatus 1, a heat-source-side circuit 110 in the first heat source unit 10A or the second heat source unit 10B and a utilization-side circuit 120 in each utilization unit 50 are connected to each other, thereby configuring the refrigerant circuit 100. In the refrigeration cycle apparatus 1, circulation of the refrigerant in the refrigerant circuit 100 causes a vapor compression refrigeration cycle to repeat. An example in which the refrigeration cycle apparatus 1 is applied to an air conditioning apparatus will be described here.

(2-1-1) First Heat Source Unit 10A, Second Heat Source Unit 10B

To simplify the description, a case in which the first heat source unit 10A before renewal and the second heat source unit 10B after renewal have the same configuration will be described here; however, the technology according to the present disclosure is applicable even when the configurations thereof are not same. For example, as illustrated in FIG. 1, each of the first heat source unit 10A and the second heat source unit 10B includes a compressor 11, an oil separator 12, a four-way valve 13, a heat-source-side heat exchanger 14, a subcooling heat exchanger 15, an accumulator 16, a refrigerant regulator 18, an oil regulator 19, a heat-source-side fan 20, the high-pressure-side shutoff valve 21, the low-pressure-side shutoff valve 22, a charge port 23, a first expansion valve 25a to a third expansion valve 25c, a first electromagnetic valve 26a to a sixth electromagnetic valve 26f, a first check valve 27a to a fourth check valve 27d, a first pressure regulating valve 28a to a third pressure regulating valve 28c, a capillary tube 29, a plurality of filters 30, and a strainer 31.

The heat-source-side heat exchanger 14 is, for example, a fin-and-tube heat exchanger and exchanges heat between air and a refrigerant. As the subcooling heat exchanger 15, for example, a plate heat exchanger is usable. The first electromagnetic valve 26a to the sixth electromagnetic valve 26f each have a function of opening and closing a flow path. The first pressure regulating valve 28a to the third pressure regulating valve 28c each have a function of keeping the pressure of the refrigerant on the upstream side at a prescribed absolute pressure that is previously determined. The tips of the arrows given to the first pressure regulating valve 28a to the third pressure regulating valve 28c indicate the downstream side of the first pressure regulating valve 28a to the third pressure regulating valve 28c. The filters 30 each have a function of removing a foreign material from the refrigerant that passes therethrough. The strainer 31 has a function of removing a solid component from the refrigerant.

The discharge side of the compressor 11 is connected to the first port of the four-way valve 13 via the oil separator 12 and the first check valve 27a. The refrigerant discharged from the compressor 11 is separated from oil at the oil separator 12 and flows toward the first port of the four-way valve 13. The second port of the four-way valve 13 is connected to one entrance of the heat-source-side heat exchanger 14, the third port of the four-way valve 13 is connected to an inlet of the accumulator 16, and the fourth port of the four-way valve 13 is connected to the low-pressure-side shutoff valve 22. In the four-way valve 13, the first port and the second port are in communication with each other while the third port and the fourth port are in communication with each other, as indicated by solid lines, during cooling operation, and the first port and the fourth port are in communication with each other while the second port and the third port are in communication with each other, as indicated by broken lines, during heating operation.

The other entrance of the heat-source-side heat exchanger 14 is connected to one end of the first expansion valve 25a and connected to the high-pressure-side shutoff valve 21 via the first expansion valve 25a. The subcooling heat exchanger 15 is installed between the other end of the first expansion valve 25a and the high-pressure-side shutoff valve 21. The first expansion valve 25a is provided on the liquid side of the heat-source-side heat exchanger 14 and able to regulate the degree of decompression of the refrigerant that passes therethrough. The subcooling heat exchanger 15, a subcooling circuit 32a, and a second expansion valve 25b constitute a subcooling portion 32. The subcooling circuit 32a diverges from a diverging point P1 at a part extending from the other end of the first expansion valve 25a toward the high-pressure-side shutoff valve 21 and is connected, through the subcooling heat exchanger 15, to a merging point P2 between the four-way valve 13 and the accumulator 16. The second expansion valve 25b provided between the diverging point P1 and the subcooling heat exchanger 15 is able to regulate the degree of decompression of the refrigerant that passes through the subcooling circuit 32a. The subcooling heat exchanger 15 causes heat to be exchanged between the refrigerant that flows between the diverging point P1 and the high-pressure-side shutoff valve 21 and the refrigerant that flows from the diverging point P1 toward the merging point P2 in the subcooling circuit 32a.

A diverging point P3, the first electromagnetic valve 26a, a merging point P4, and the second check valve 27b are provided in this order from the subcooling heat exchanger 15 toward the merging point P2 in the subcooling circuit 32a. The diverging point P1 and the merging point P4 are connected to each other via the first pressure regulating valve 28a, and the refrigerant flows from the diverging point P1 toward the merging point P4. The diverging point P3 is connected to an injection port of the compressor 11. Accordingly, an intermediate-pressure refrigerant decompressed at the second expansion valve 25b exits from the subcooling heat exchanger 15, diverges on the upstream of the first electromagnetic valve 26a, and flows into the injection port of the compressor 11.

One outlet of the accumulator 16 is directly connected to the suction side of the compressor 11 to return a gas refrigerant to the suction side of the compressor 11, and the other outlet of the accumulator 16 is connected for oil-returning to the suction side of the compressor 11 via the filter 30 and the second electromagnetic valve 26b. Between the suction side of the compressor 11 and the oil separator 12, a path that passes the filter 30, the third electromagnetic valve 26c, and the capillary tube 29 is formed to return the separated oil to the compressor 11.

One entrance of the refrigerant regulator 18 is connected to the suction side of the compressor 11 via the third expansion valve 25c. The refrigerant regulator 18 is a device that regulates the amount of the refrigerant that flows in the refrigerant circuit 100. The other entrance of the refrigerant regulator 18 is connected to the merging point P2 via the second pressure regulating valve 28b. The outflow side of the first check valve 27a is connected to the other entrance of the refrigerant regulator 18 via the fourth electromagnetic valve 26d and the third check valve 27c. The refrigerant regulator 18 has a function of keeping the amount of the refrigerant that flows in the refrigerant circuit 100 to be constant.

One entrance of the oil regulator 19 is connected to the suction side of the compressor 11 via the sixth electromagnetic valve 26f. The other entrance of the oil regulator 19 is connected to the merging point P2 via the third pressure regulating valve 28c. The outflow side of the first check valve 27a is connected to the other entrance of the oil regulator 19 via the fifth electromagnetic valve 26e and the fourth check valve 27d. The oil regulator 19 has a function of keeping the amount of oil supplied to the refrigerant circuit 100 to be constant.

The heat-source-side fan 20 is disposed at the heat-source-side heat exchanger 14. The heat-source-side fan 20 causes an airflow for accelerating heat exchange to be generated in the heat-source-side heat exchanger 14.

The filter 30 are provided between the oil separator 12 and the first check valve 27a, between the heat-source-side heat exchanger 14 and the first expansion valve 25a, between the subcooling heat exchanger 15 and the high-pressure-side shutoff valve 21, between the fourth port of the four-way valve 13 and the low-pressure-side shutoff valve 22, between the other outlet of the accumulator 16 and the second electromagnetic valve 26b, between the oil separator 12 and the third electromagnetic valve 26c, between the third expansion valve 25c and the refrigerant regulator 18, and between the oil regulator 19 and the sixth electromagnetic valve 26f. The strainer 31 is provided between the oil regulator 19 and the third pressure regulating valve 28c. The charge port 23 is provided between the filter 30 and the third expansion valve 25c.

(2-1-2) Utilization Units 50

As illustrated in FIG. 1, each of the utilization units 50 includes, for example, a utilization-side heat exchanger 51, a utilization-side expansion valve 52, and a utilization-side fan 53. The utilization-side heat exchanger 51 is, for example, a fin-and-tube heat exchanger and causes heat to be exchanged between air and a refrigerant. The utilization-side expansion valve 52 and the utilization-side heat exchanger 51 are series connected between the liquid-side connection pipe 81 and the gas-side connection pipe 82. The utilization-side expansion valve 52 and the utilization-side heat exchanger 51 are disposed in the order of the utilization-side expansion valve 52 and the utilization-side heat exchanger 51 from the liquid-side connection pipe 81 toward the gas-side connection pipe 82. The utilization-side fan 53 is disposed at each utilization-side heat exchanger 51. The utilization-side fan 53 causes an airflow for accelerating heat exchange to be generated in the utilization-side heat exchanger 51. The plurality of utilization units 50 parallel connected between the liquid-side connection pipe 81 and the gas-side connection pipe 82 constitute the utilization-side circuit 120.

(2-1-3) Control System

Figure 9:
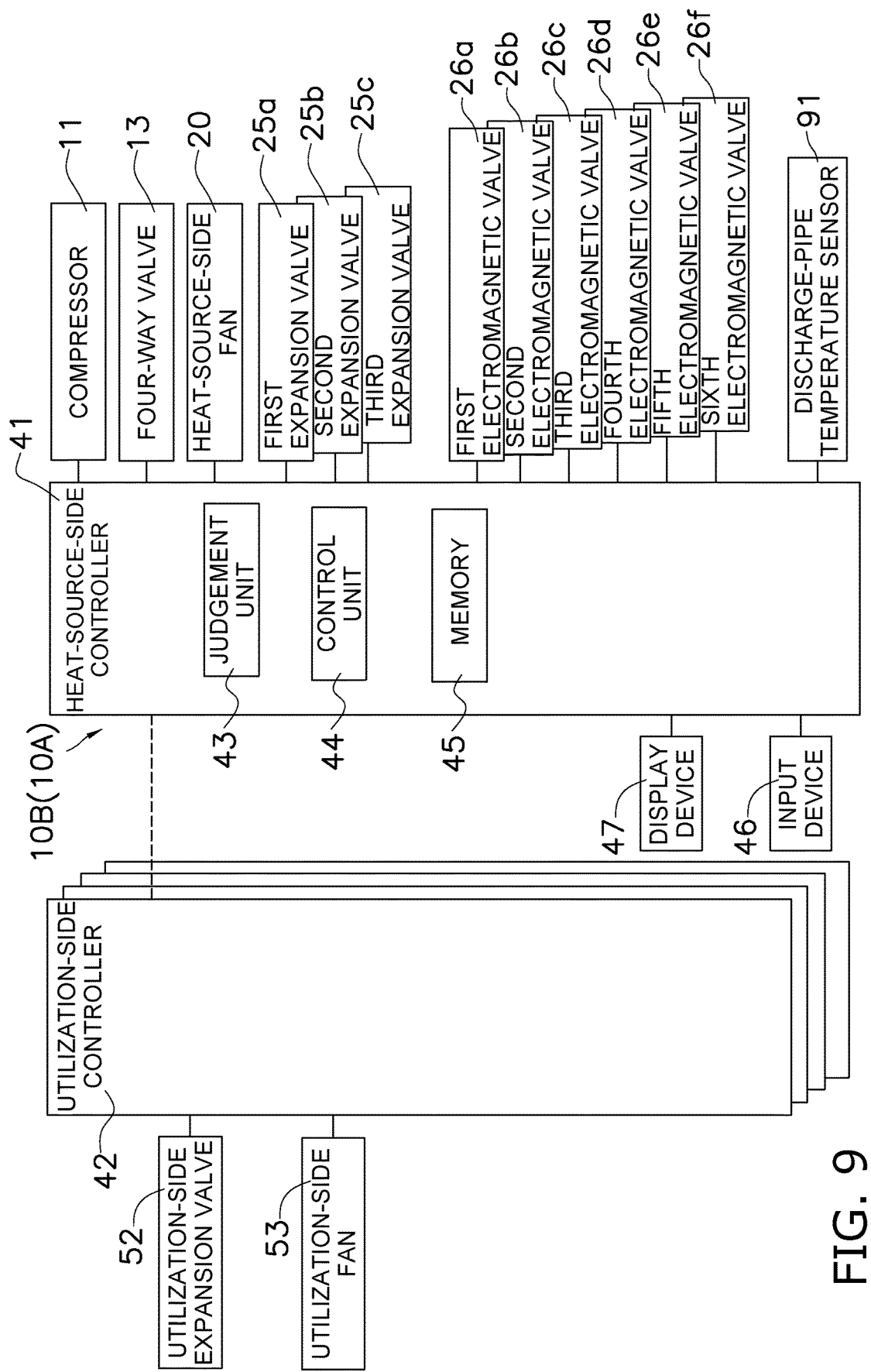
FIG. 9 is a block diagram illustrating an outline of a control system of the refrigeration cycle apparatus.

As illustrated in FIG. 9, the control system 40 of the refrigeration cycle apparatus 1 is configured to include a heat-source-side controller 41 and utilization-side controllers 42. The heat-source-side controller 41 is included in each of the first heat source unit 10A and the second heat source unit 10B. A case in which a plurality of the utilization-side controllers 42 are provided is described here since there are a plurality of the utilization units 50; however, if one utilization unit 50 is provided, one utilization-side controller 42 is sufficient. The controllers may not be separated as with the heat-source-side controller 41 and the utilization-side controllers 42 and may be combined into one controller.

The heat-source-side controller 41 includes a judgement unit 43 and a control unit 44. The heat-source-side controller 41 controls the compressor 11, the four-way valve 13, the heat-source-side fan 20, the first expansion valve 25a to the third expansion valve 25c, the first electromagnetic valve 26a to the sixth electromagnetic valve 26f and performs control relating to the refrigeration cycle. The utilization-side controllers 42 controls the utilization-side expansion valve 52 and the utilization-side fan 53 and performs control relating to the refrigeration cycle. The heat-source-side controller 41 and the utilization-side controllers 42 each include a plurality of temperature sensors, a plurality of pressure sensors, and the like; however, description of the sensors is omitted here.

The second heat source unit 10B is configured to store, in the second heat source unit 10B, a mixture ratio of the recovered refrigerant and the second refrigerant charged in the second heat source unit 10B and display the mixture ratio. The second heat source unit 10B includes an input device 46 and a display device 47 that are connected to the heat-source-side controller 41. The heat-source-side controller 41 of the second heat source unit 10B includes a memory 45.

In the aforementioned embodiment, the heat-source-side controller 41 and the utilization-side controllers 42 can be configured to perform control by interpreting and executing an executable program and data stored in the memory 45 by a CPU (not illustrated). The program and the data may be introduced into the memory 45 via a storage medium or may be directly executed from the storage medium. Introduction of the program and the data from the storage medium to the memory 45 may be performed via a telephone line, a carrying path, or the like. The heat-source-side controller 41 and the utilization-side controllers 42 may be configured by using an integrated circuit (IC) capable of performing control similar to control that is performed by using the CPU and the memory 45. The IC mentioned here includes a LSI (large-scale integrated circuit), an ASIC (application-specific integrated circuit), a gate array, a FPGA (field programmable gate array), and the like. For example, an operator who has charged a refrigerant to the second heat source unit 10B stores a mixture ratio of the recovered refrigerant and the second refrigerant charged in the second heat source unit 10B into the memory 45 by using the input device 46 (the step S6 illustrated in FIG. 4). When information of the mixture ratio stored in the memory 45 is necessary, an operator uses the input device 46 to retrieve the information of the mixture ratio from the memory 45 and causes the display device 47 to display the information of the mixture ratio.

A case in which the second heat source unit 10B includes the memory 45 that stores the information of the mixture ratio and the display device 47 that displays the information of the mixture ratio is described here. The second heat source unit 10B, however, may be configured to include one of the memory 45 and the display device 47. For example, it may be configured such that the information stored in the memory 45 can be displayed on a display screen of a portable terminal or the like, and the display device 47 may be omitted. In addition, for example, it may be configured such that the second heat source unit 10B has a communication function that acquires the information stored in a location (an external storage device, such as a cloud computer or a server) other than the second heat source unit 10B and such that the acquired information of the mixture ratio is displayed on the display device 47.

(2-1-4) Cooling Operation

In cooling operation, the refrigeration cycle apparatus 1 causes the four-way valve 13 to be in the state indicated by the solid lines, in other words, in a state in which the first port and the second port are in communication each other while the third port and the fourth port are in communication with each other. In the refrigeration cycle performed in cooling operation, the heat-source-side heat exchanger 14 functions as a radiator, and the utilization-side heat exchanger 51 functions as an evaporator. The refrigerant discharged from the compressor 11 successively circulates in the heat-source-side heat exchanger 14, the utilization-side expansion valve 52, and the utilization-side heat exchanger 51 and repeats the vapor compression refrigeration cycle of compression, condensation, expansion, and evaporation.

The refrigeration cycle apparatus 1 controls the operation frequency of the compressor 11 to cause the evaporation pressure or the evaporation temperature in the utilization-side heat exchanger 51 to be a target pressure or a target evaporation temperature and controls the valve opening degree of each utilization-side expansion valve 52 to cause the degree of superheating of the refrigerant that flows on the gas side of the utilization-side heat exchanger 51 to be a target degree of superheating. In cooling operation, the first expansion valve 25a is in a fully opened state. The refrigeration cycle apparatus 1 regulates the opening degree of the second expansion valve 25b to cause the degree of superheating of the refrigerant that has exited from the subcooling heat exchanger 15 to be a target degree of superheating. When a prescribed condition is satisfied, the refrigeration cycle apparatus 1 causes the refrigerant that flows in the subcooling circuit 32a to exchange heat in the subcooling heat exchanger 15 with the refrigerant that flows between the diverging point P1 and the high-pressure-side shutoff valve 21 and to become a gas refrigerant having an intermediate pressure and supplies the refrigerant through the injection port to a compression chamber of the compression mechanism of the compressor 11 in the middle of compression. The compressor 11 that has been supplied with the gas refrigerant having the intermediate pressure can decrease the discharge temperature, compared with when the gas refrigerant is not injected.

(2-1-5) Heating Operation

In heating operation, the refrigeration cycle apparatus 1 causes the four-way valve 13 to be in the state indicated by the broken lines, in other words, in a state in which the first port and the fourth port are in communication with each other while the second port and the third port are in communication with each other. In the refrigeration cycle performed in heating operation, the heat-source-side heat exchanger 14 functions as an evaporator, and the utilization-side heat exchanger 51 functions as a radiator. The refrigerant discharged from the compressor 11 successively circulates in the utilization-side heat exchanger 51, the first expansion valve 25a, and the heat-source-side heat exchanger 14 and repeats the vapor compression refrigeration cycle of compression, condensation, expansion, and evaporation.

In heating operation, the second expansion valve 25b is a fully closed state. The refrigeration cycle apparatus 1 controls the operation frequency of the compressor 11 to cause the condensation temperature in the utilization-side heat exchanger 51 to be a target condensation temperature and controls the valve opening degree of the utilization-side expansion valve 52 to cause the degree of subcooling of the refrigerant that flows on the liquid side of the utilization-side heat exchanger 51 to be a target degree of subcooling. The refrigeration cycle apparatus 1 controls the valve opening degree of the first expansion valve 25a to cause the degree of superheating of the refrigerant that flows on the gas side of the heat-source-side heat exchanger 14 to be a target degree of superheating.

(2-2) Measurement System 60

The measurement system 60 includes the scale 61, which is illustrated in FIG. 3. The scale 61 is, for example, a platform weighing scale or a crane weighing scale. The scale 61 has a function capable of measuring the weight of the first heat source unit 10A or the second heat source unit 10B and has resolving power sufficient for detecting the weight of the refrigerant.

(2-3) Transfer of Refrigerant

In the transfer of the refrigerant from the first heat source unit 10A to the second heat source unit 10B, for example, with the first heat source unit 10A being incorporated in the refrigeration cycle apparatus 1 and being in a operable state, the refrigerant of the utilization-side circuit 120 is transferred to the heat-source-side circuit 110 of the first heat source unit 10A through pump down operation. Then, the high-pressure-side shutoff valve 21 and the low-pressure-side shutoff valve 22 of the first heat source unit 10A are closed. Then, after the pump down operation, with the high-pressure-side shutoff valve 21 and the low-pressure-side shutoff valve 22 of the first heat source unit 10A closed, the first heat source unit 10A is detached and made to be in a temporarily placed state. In the pump down operation, for example, the high-pressure-side shutoff valve 21 is closed, and the first heat source unit 10A is operated to perform cooling. The high-pressure-side shutoff valve 21 is closed, and operation in which the heat-source-side heat exchanger 14 of the first heat source unit 10A functions as a condenser is performed. When the pressure of the low-pressure-side shutoff valve 22 becomes sufficiently low, the low-pressure-side shutoff valve 22 is closed.

Next, the first heat source unit 10A is detached from the refrigeration cycle apparatus 1, and the second heat source unit 10B is incorporated in the refrigeration cycle apparatus 1. Then, as illustrated in FIG. 2, a service port of the high-pressure-side shutoff valve 21 of the first heat source unit 10A and the charge port 23 of the second heat source unit 10B are connected to each other by the charge hose 70. A means of transferring the refrigerant includes the charge hose 70. The second heat source unit 10B is operated to drive the compressor 11, and the refrigerant is transferred through the service port of the high-pressure-side shutoff valve 21 of the first heat source unit 10A into the charge port 23 of the second heat source unit 10B. When the second heat source unit 10B is to be operated to drive the compressor 11, the third expansion valve 25c is closed, cooling operation is performed, and the recovered refrigerant is sucked along a path in which the recovered refrigerant is sucked from the refrigerant regulator 18 by the compressor 11 through the accumulator 16. By detaching the charge hose 70 from the charge port 23 and the service port of the high-pressure-side shutoff valve 21, the charge port 23 and the service port of the high-pressure-side shutoff valve 21 are closed.

(3) Modifications (3-1) Modification 1A

In the aforementioned embodiment, a case in which both of the first heat source unit 10A and the second heat source unit 10B of the refrigeration cycle apparatus 1 are configured such that heat radiation and heat absorption of the refrigeration cycle are switchable has been described; however, the refrigeration cycle apparatus 1 is not limited to having such a configuration. In the refrigeration cycle apparatus 1, for example, the first heat source unit 10A or the second heat source unit 10B may be an exclusive machine that functions as a heat source whose heat is radiated from the refrigerant, and the utilization units 50 may be exclusive machines each function as a device whose heat is absorbed by the refrigerant. In this case, when the refrigeration cycle apparatus 1 is an air conditioning apparatus, the exclusive machines are machines exclusive for cooling. In the refrigeration cycle apparatus 1, for example, the first heat source unit 10A or the second heat source unit 10B may be an exclusive machine that functions as a heat source whose heat is absorbed by the refrigerant, and the utilization units 50 may be exclusive machines each function as a device whose heat is radiated from the refrigerant. In this case, when the refrigeration cycle apparatus 1 is an air conditioning apparatus, the exclusive machines are machines exclusive for heating.

(3-2) Modification 1B

The order of performing the operations in the step S3 and the step S4 is not limited to the order illustrated in FIG. 4; the operation of measurement in the step S4 may be performed after the operation of transfer of the refrigerant in the step S3, the operation in the step S3 may be performed after the step S4, or the operations in the step S3 and step S4 may be performed in parallel.

(3-3) Modification 1C

In the aforementioned embodiment, a case in which the first refrigerant is the R410A refrigerant and the second refrigerant is the R32 refrigerant has been described; however, the combination of the first refrigerant and the second refrigerant usable in the refrigeration cycle apparatus 1 is not limited thereto. For example, the first refrigerant and the second refrigerant may be an R410A refrigerant and an R452B refrigerant, respectively. In addition, the first refrigerant and the second refrigerant may be an R410A refrigerant and an R454B refrigerant, respectively. In addition, the first refrigerant and the second refrigerant may be an R32 refrigerant and an R410A refrigerant, respectively. When the first refrigerant is an R32 refrigerant and the second refrigerant is an R410A refrigerant, flammability is reduced compared with only the R32 refrigerant. As the ratio of the R410A refrigerant increases compared with the ratio of the R32 ratio, flammability changes further from slight flammable to non-flammable. Moreover, the combination of the refrigerants may be a combination of refrigerants other than a HFC refrigerant.

(3-4) Modification 1D

In the aforementioned embodiment, the refrigeration cycle apparatus 1 of a multi type in which the refrigeration cycle apparatus 1 includes the plurality of utilization units 50 has been described. A refrigeration cycle apparatus to which the technology of the present disclosure is applicable is, however, not limited to the multi-type refrigeration cycle apparatus. The technology of the present disclosure is also applicable to, for example, a refrigeration cycle apparatus of a pair type in which one utilization unit is connected to one heat source unit.

The number of heat source units connected to the refrigeration cycle apparatus is not limited to one, and a plurality of heat source units may be connected thereto. For example, when the refrigeration cycle apparatus includes two first heat source units, it is sufficient to transport the recovered refrigerant to two second heat source units that replace the two first heat source units and to measure the weight of the two second heat source units that are after the transfer by the measurement system 60 to thereby detect the weight of the recovered refrigerant.

(3-5) Modification 1E

In the aforementioned embodiment, a case in which the compressor 11 of the first heat source unit 10A is used as a power source of the transfer of the refrigerant has been described. The power source of the transfer of the refrigerant is, however, not limited to the compressor 11 of the first heat source unit 10A. For example, a refrigerant recovering device that includes a compressor therein may be used for the transfer of the refrigerant.

(3-6) Modification 1F

Figure 5:
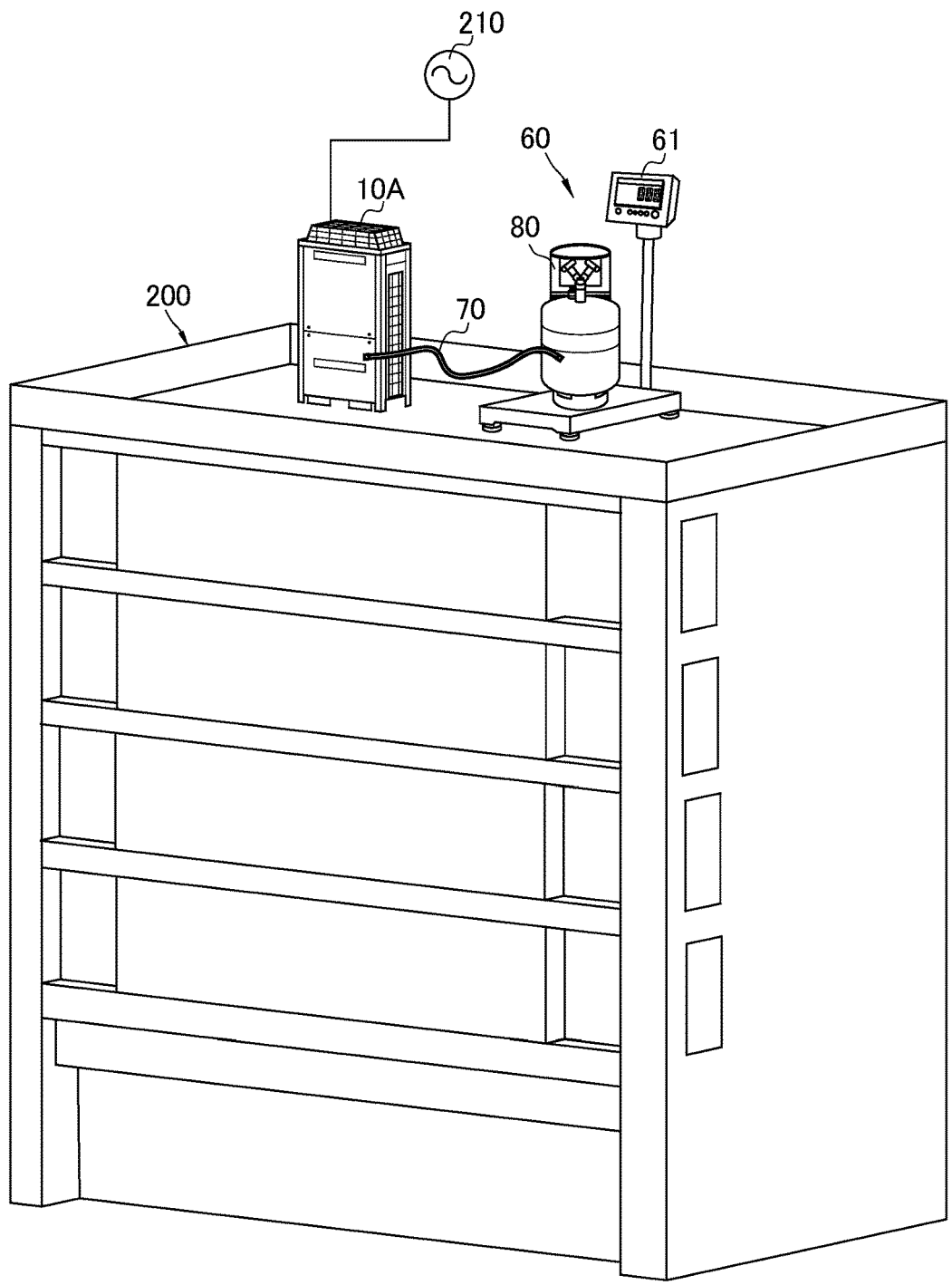
FIG. 5 is a schematic diagram for describing measurement of the weight of a refrigerant in a modification 1F.

In the aforementioned embodiment, a case in which the refrigerant is directly transferred from the first heat source unit 10A to the second heat source unit 10B has been described; however, as illustrated in FIG. 5, the refrigerant may be once transferred from the first heat source unit 10A to a recovery cylinder 80, and then, the refrigerant may be transferred from the recovery cylinder 80 to the second heat source unit 10B. In this case, it may be configured such that the scale 61 measures the weight of the recovery cylinder 80 before the recovery of the recovered refrigerant into the recovery cylinder 80 and the weight of the recovery cylinder 80 after the recovery of the recovered refrigerant into the recovery cylinder 80 and measures the weight of the recovered refrigerant from a difference between the weights of the recovery cylinder 80 before and after the recovery.

When the recovery cylinder 80 is to be thus used, for example, if the first heat source unit 10A is connected to the power source 210 and operable, the refrigerant of the utilization-side circuit 120 is transferred to the heat-source-side circuit 110 of the first heat source unit 10A through pump down operation. The service port of the high-pressure-side shutoff valve 21 of the first heat source unit 10A and the recovery cylinder 80 are connected to each other by the charge hose 70. As a result of the charge hose 70 being attached to the service port of the high-pressure-side shutoff valve 21 and the recovery cylinder 80, the heat-source-side circuit 110 of the first heat source unit 10A and the recovery cylinder 80 are in communication with each other. Then, the first heat source unit 10A is operated to drive the compressor 11, and the refrigerant is transferred through the service port of the high-pressure-side shutoff valve 21 of the first heat source unit 10A to the recovery cylinder 80. By closing the recovery cylinder 80 and detaching the charge hose 70 from the service port of the high-pressure-side shutoff valve 21 and the recovery cylinder 80, the service port of the high-pressure-side shutoff valve 21 is closed.

Figure 6:
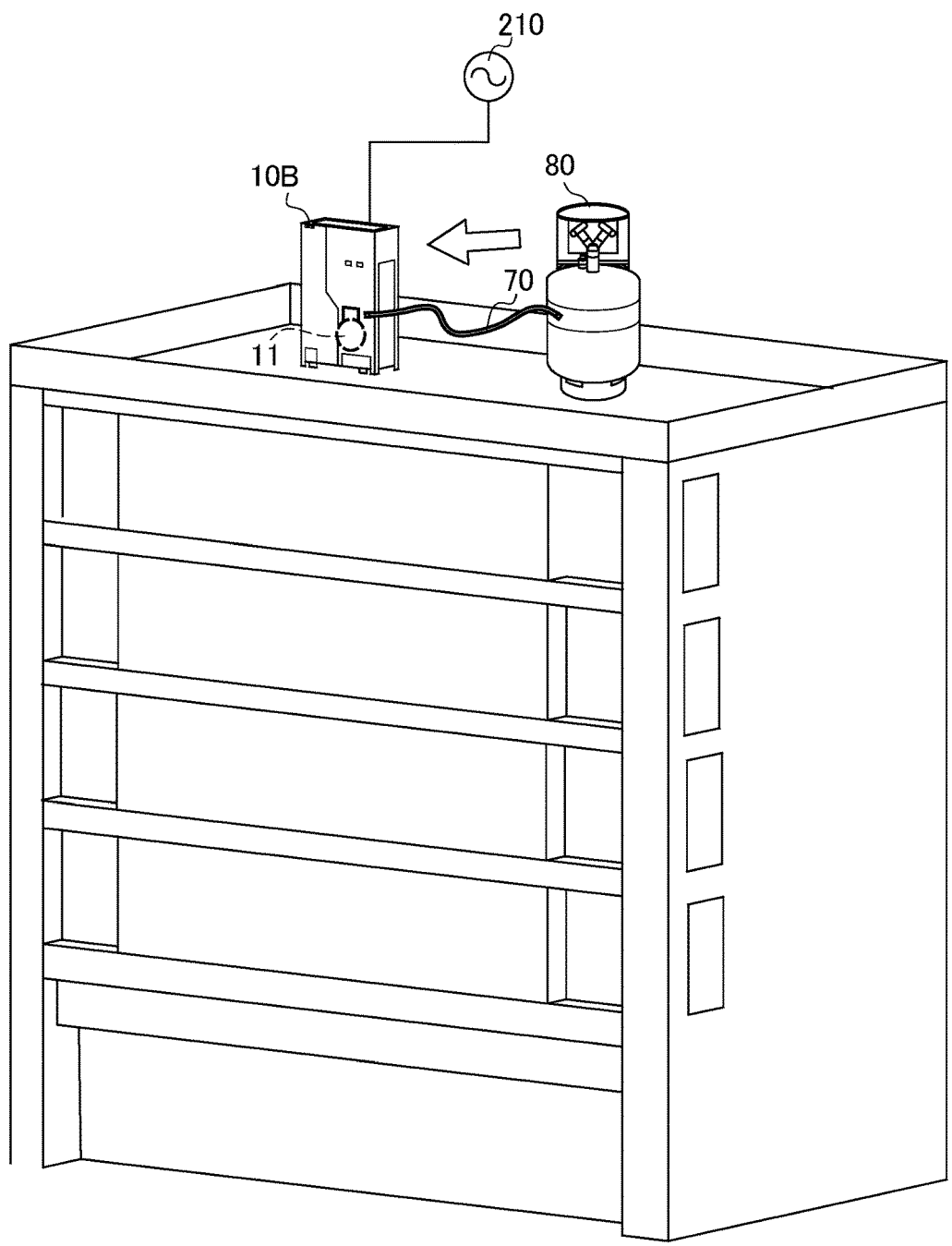
FIG. 6 is a schematic diagram for describing measurement of the weight of a refrigerant in the modification 1F.

With respect to the refrigeration cycle apparatus 1 after the second heat source unit 10B is incorporated therein, for example, airtightness of the refrigeration cycle apparatus 1 is inspected, and, after the airtightness of the refrigeration cycle apparatus 1 is confirmed, the refrigeration cycle apparatus 1 is evacuated by a vacuum pump. When the recovered refrigerant is to be transferred from the recovery cylinder 80 to the second heat source unit 10B incorporated in the refrigeration cycle apparatus 1, the recovery cylinder 80 and the charge port 23 of the second heat source unit 10B are connected to each other, as illustrated in FIG. 6, by the charge hose 70. As a result of the charge hose 70 being attached to the charge port 23 and the recovery cylinder 80, the heat-source-side circuit 110 of the second heat source unit 10B and the recovery cylinder 80 are in communication with each other. Then, the second heat source unit 10B is operated to drive the compressor 11, and the refrigerant is transferred from the recovery cylinder 80 to the charge port 23 of the second heat source unit 10B. By closing the recovery cylinder 80 and detaching the charge hose 70 from the charge port 23 and the recovery cylinder 80, the charge port 23 is closed.

It may be configured such that the scale 61 measures the weight of the recovery cylinder 80 after the recovery of the recovered refrigerant into the recovery cylinder 80 and the weight of the recovery cylinder 80 after the transfer of the recovered refrigerant from the recovery cylinder 80 to the second heat source unit 10B and measures the weight of the recovered refrigerant from a difference between the weights of the recovery cylinder 80 before and after the transfer.

(3-7) Modification 1G

Figure 7:
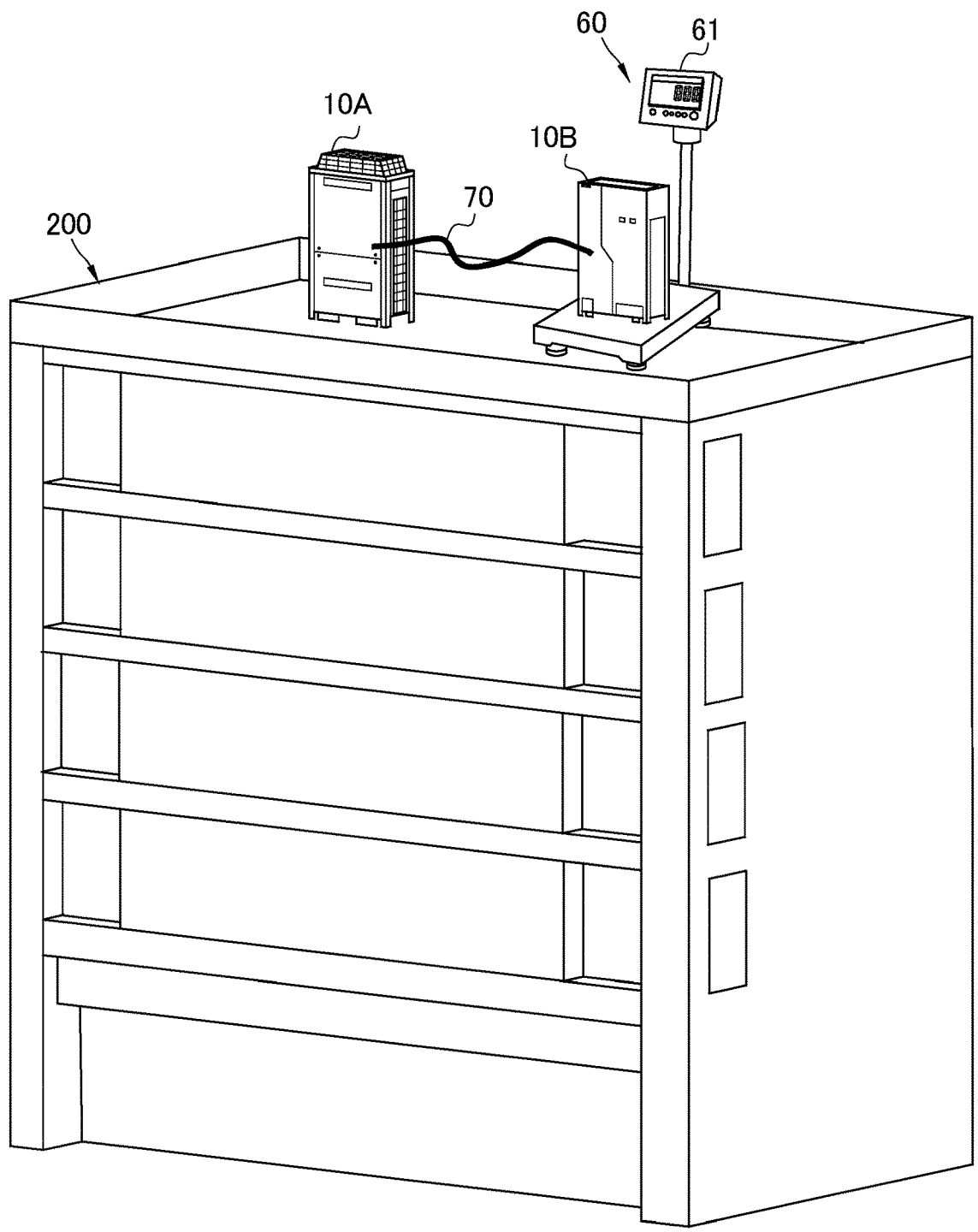
FIG. 7 is a schematic diagram for describing measurement of the weight of a refrigerant in a modification 1G.

In the aforementioned embodiment, a case in which the weight of the first heat source unit 10A before and after the transfer of the refrigerant to the second heat source unit 10B are measured has been described; however, as illustrated in FIG. 7, the weight of the second heat source unit 10B before and after the transfer of the refrigerant to the second heat source unit 10B may be measured. The weight of the second heat source unit 10B is measured by the scale 61. The scale 61 measures the recovered refrigerant transferred to the second heat source unit 10B by measuring the weight of the second heat source unit 10B both of before the recovered refrigerant is transferred to the second heat source unit 10B and after the recovered refrigerant is transferred to the second heat source unit 10B. It is possible to calculate the weight of the recovered refrigerant by subtracting a measured value obtained by the scale 61 regarding the second heat source unit 10B before the transfer of the recovered refrigerant to the second heat source unit 10B from a measured value obtained by the scale 61 regarding the second heat source unit 10B after the transfer of the recovered refrigerant to the second heat source unit 10B.

In the transfer of the refrigerant from the first heat source unit 10A to the second heat source unit 10B, for example, when the first heat source unit 10A is connected to the power source 210 and operable, the refrigerant of the utilization-side circuit 120 is transferred to the heat-source-side circuit 110 of the first heat source unit 10A through pump down operation. For example, the high-pressure-side shutoff valve 21 is closed, and the first heat source unit 10A is operated to perform cooling. The high-pressure-side shutoff valve 21 is closed, and operation in which the heat-source-side heat exchanger 14 of the first heat source unit 10A functions as a condenser is performed. When the pressure of the low-pressure-side shutoff valve 22 becomes sufficiently low, the low-pressure-side shutoff valve 22 is closed. The service port of the high-pressure-side shutoff valve 21 of the first heat source unit 10A and the charge port 23 of the second heat source unit 10B are connected to each other by the charge hose 70. As a result of the charge hose 70 being attached to the charge port 23 and the service port of the high-pressure-side shutoff valve 21, the heat-source-side circuit 110 of the first heat source unit 10A and the heat-source-side circuit 110 of the second heat source unit 10B are in communication with each other. Then, the first heat source unit 10A is operated to drive the compressor 11, and the refrigerant is transferred through the service port of the high-pressure-side shutoff valve 21 of the first heat source unit 10A to the charge port 23 of the second heat source unit 10B. By detaching the charge hose 70 from the charge port 23 and the service port of the high-pressure-side shutoff valve 21, the charge port 23 and the service port of the high-pressure-side shutoff valve 21 are closed. Since the recovered refrigerant has been transferred in the second heat source unit 10B, the recovered refrigerant in the second heat source unit 10B is charged to the refrigeration cycle apparatus 1 as a result of the second heat source unit 10B being incorporated in the refrigeration cycle apparatus 1.

A small amount of the refrigerant may be previously charged in the second heat source unit 10B. In this case, it is sufficient to regulate such that the total sum of the weight of the recovered refrigerant, the weight of the previously charged refrigerant, and, as necessary, the weight of the additional refrigerant is the gross weight of the refrigerants that is appropriate for the refrigeration cycle apparatus 1 after renewal.

(3-8) Modification 1H

Figure 8:
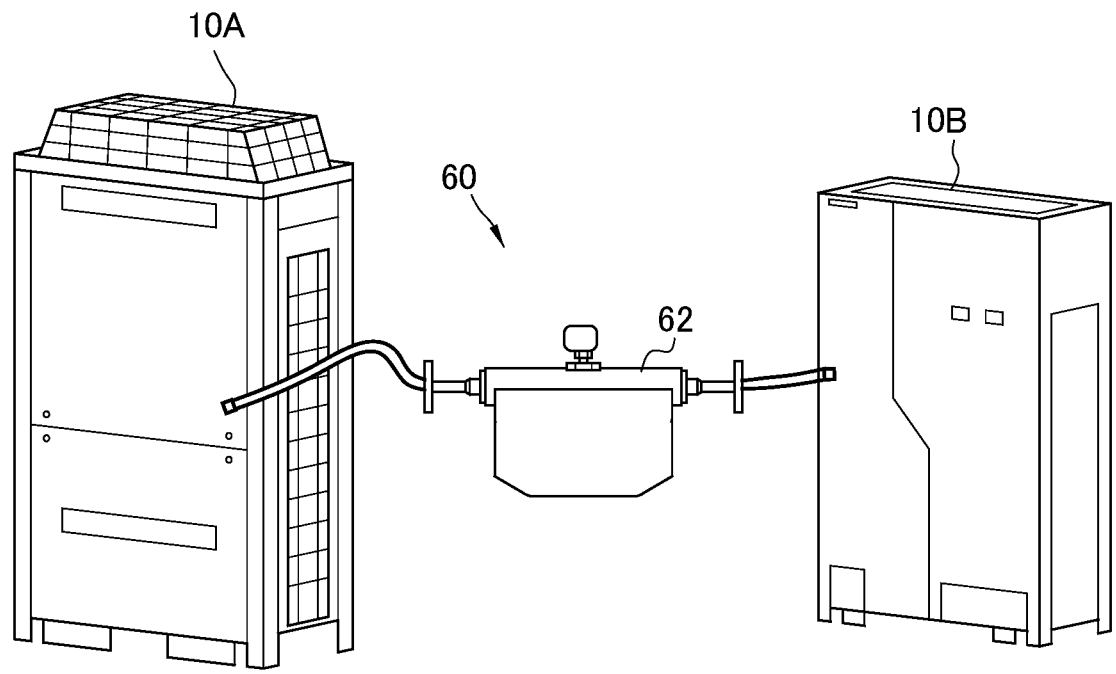
FIG. 8 is a schematic diagram for describing measurement of the weight of a refrigerant in a modification 1H.

In the embodiment and the modifications mentioned above, a case in which the scale 61 is used to measure the weight of the recovered refrigerant has been described; however, as illustrated in FIG. 8, a mass flow meter 62 may be used to measure the weight of the recovered refrigerant that is transferred from the first heat source unit 10A to the second heat source unit 10B. In this case, the mass flow meter 62 is included in the measurement system 60. The mass flow meter 62 is, for example, a Coriolis flow meter. Using the Coriolis flow meter makes it possible to measure the mass of the recovered refrigerant even when the refrigerant is transferred from the first heat source unit 10A to the second heat source unit 10B in a gas-liquid two-phase state. Considering that a difference of gravitational acceleration on the earth is minute, it is treated in the present disclosure that a measured value (kg) obtained by the mass flow meter 62 is nearly equal to the weight (kgf) of the recovered refrigerant. Measurement using the mass flow meter 62 can be performed in a case in which the refrigerant is transferred from the first heat source unit 10A to the second heat source unit 10B with the first heat source unit 10A connected to the power source 210, a case in which the refrigerant is transferred from the first heat source unit 10A to the second heat source unit 10B with the second heat source unit 10B connected to the power source 210, or a case in which the refrigerant is transferred from the first heat source unit 10A to the second heat source unit 10B via the recovery cylinder 80.

(3-9) Modification 1I

In the refrigerant charging method for the refrigeration cycle apparatus 1 described in the aforementioned embodiment, it is preferable to further include a step of, before recovering the refrigerant from the first heat source unit 10A, operating the already installed refrigeration cycle apparatus 1 and heating the refrigerant in the refrigerant circuit 100.

(3-10) Modification 1J

The refrigerant charging method for the refrigeration cycle apparatus 1 may further include, before the step S1 of the aforementioned embodiment, a step of, after packing a nitrogen gas in the second heat source unit 10B to prepare the second heat source unit 10B, transporting the second heat source unit 10B with the nitrogen gas packed in the second heat source unit 10B to the installation location, which is the rooftop of the building 200 in the aforementioned embodiment, of the already installed refrigeration cycle apparatus 1.

In the step S2, when the second heat source unit 10B is to be incorporated in the refrigeration cycle apparatus 1, the nitrogen gas is extracted from the second heat source unit 10B. Then, the second heat source unit 10B from which the nitrogen gas has been extracted is connected to the plurality of utilization units 50.

(3-11) Modification 1K

The refrigerant charging method for the refrigeration cycle apparatus 1 can be configured to further include, before the step S1 of the aforementioned embodiment, a step of, after packing an R32 in a prescribed pressure range in the second heat source unit 10B to prepare the second heat source unit 10B, transporting the second heat source unit 10B with the R32 refrigerant packed in the second heat source unit 10B to the installation location, which is the rooftop of the building 200 in the aforementioned embodiment, of the already installed refrigeration cycle apparatus 1.

In the step S2, when the second heat source unit 10B is to be incorporated in the refrigeration cycle apparatus 1, with the plurality of utilization units 50 being evacuated, the second heat source unit 10B is connected to the plurality of utilization units 50 without extracting the R32 refrigerant from the second heat source unit 10B.

The prescribed pressure range described above is preferably, for example, an absolute pressure that is more than or equal to the atmospheric pressure at 20° C. and that is in a pressure range of less than 1 Mpa at 35° C.

(3-12) Modification 1L

The refrigerant charging method for the refrigeration cycle apparatus 1 may be configured to further include a step of, when the recovered refrigerant and the second refrigerant are mixed together through charging to the refrigeration cycle apparatus 1 after renewal and become a mixed refrigerant, judging whether the mixed refrigerant is non-flammable and/or judging whether the mixed refrigerant is flammable.

For example, when the first refrigerant is an R410A refrigerant and the second refrigerant is an R32 refrigerant, while pentafluoroethane is non-flammable, the R32 refrigerant (difluoromethane) has flammability, even though slightly; therefore, when the ratio of difluoromethane occupying the mixed refrigerant after charging increases, the mixed refrigerant has a possibility of having slight flammability. Thus, the mixture ratio of difluoromethane and pentafluoroethane at which the mixed refrigerant becomes non-flammable is previously examined, and the upper limit threshold of the mixture ratio of difluoromethane at which it can be judged to be non-flammable is determined in advance. Consequently, when an air conditioner after renewal is an apparatus intended for a non-flammable refrigerant, the refrigerant is usable as it is. The mixed refrigerant is judged, from the measured weight of the recovered refrigerant and the weight of an R32 refrigerant to be completed, to be non-flammable when the mixture ratio of difluoromethane occupying the mixed refrigerant is smaller than the upper limit threshold. When the mixed refrigerant can be judged to be non-flammable, only the R32 refrigerant is completed. If it is not possible to judge that the mixed refrigerant is non-flammable, charging is performed such that the mixed refrigerant becomes non-flammable by, for example, adding another refrigerant, such as pentafluoroethane.

Alternatively, a lower limit threshold of the mixture ratio of difluoromethane at which it is judged to be flammable is previously determined. The mixed refrigerant is judged, from the measured weight of the recovered refrigerant and the weight of an R32 refrigerant to be completed, to be flammable when the mixture ratio of difluoromethane occupying the mixed refrigerant is larger than the lower limit threshold. If the mixed refrigerant is judged to be flammable, for example, replenish of the R32 refrigerant is stopped, and a measure of, for example, completing an R410 instead is taken. Alternatively, if the mixed refrigerant is judged to be flammable, a measure of modifying the refrigeration cycle apparatus 1 after renewal to be, for example, compatible with a flammable refrigerant.

(3-13) Modification 1M

In the aforementioned embodiment, a case in which each of the first heat source unit 10A and the second heat source unit 10B is provided with the subcooling heat exchanger 15 has been described; however, the first heat source unit 10A and/or the second heat source unit 10B may not be provided with the subcooling heat exchanger 15.

In addition, a case in which each of the first heat source unit 10A and the second heat source unit 10B is provided with the oil regulator 19 has been described; however, the first heat source unit 10A and/or the second heat source unit 10B may not be provided with the oil regulator 19.

In addition, a case in which each of the first heat source unit 10A and the second heat source unit 10B is provided with the refrigerant regulator 18 has been described; however, the first heat source unit 10A and/or the second heat source unit 10B may not be provided with the refrigerant regulator 18.

In addition, a case in which each of the first heat source unit 10A and the second heat source unit 10B is provided with the oil separator 12 has been described; however, the first heat source unit 10A and/or the second heat source unit 10B may not be provided with the oil separator 12.

(3-14) Modification 1N

In the aforementioned embodiment, there has been described a step in which, by using the memory 45 and/or the display device 47, the mixture ratio of the recovered refrigerant and the second refrigerant that are charged in the second heat source unit 10B is stored in the second heat source unit 10B and/or the mixture ratio is displayed on the second heat source unit 10B. As a method other than this, the record of the mixture ratio may be left in the second heat source unit 10B. For example, the mixture ratio may be recorded on a recording sheet, and the recording sheet may be stored in the second heat source unit 10B.

(4) Features (4-1)

In the refrigerant charging with respect to the refrigeration cycle apparatus 1 of the aforementioned embodiment, the recovered refrigerant that is obtained by recovering the first refrigerant from the already installed refrigeration cycle apparatus 1 is charged to the refrigeration cycle apparatus 1 after renewal, the second refrigerant is further charged thereto, and efficiency in charging work for the second heat source unit 10B is thereby improved.

(4-2)

In the aforementioned embodiment, the first refrigerant is the R410A refrigerant, and the second refrigerant is the R32 refrigerant, and thus, of the already installed refrigeration cycle apparatus 1 that has been operated with the R410A refrigerant, parts other than the heat source unit are compatible with the R410A refrigerant; therefore, even when the R32 refrigerant, which is the second refrigerant, is supplemented, the refrigerant is still the mixed refrigerant of difluoromethane and pentafluoroethane, as with the R410A refrigerant, although the mixture ratio of difluoromethane and pentafluoroethane changes, and, the operation of the refrigeration cycle apparatus 1 is easily kept normal since the parts of the already installed refrigeration cycle apparatus 1 other than the heat source unit are suitable for the refrigerant compared with when the second refrigerant other than the R125 refrigerant and the R32 refrigerant is completed with respect to the R410A refrigerant.

(4-3)

As described in the aforementioned modification 1C, the first refrigerant and the second refrigerant may be the R410A refrigerant and the R452B refrigerant, respectively. In this case, the parts of the already installed refrigeration cycle apparatus 1, which has been operated with the R410A refrigerant, other than the heat source unit are normally compatible with the R452B refrigerant, which is an alternative refrigerant of the R410A refrigerant. Even when the R452B, which is the second refrigerant, is supplemented, the refrigerant is still the mixed refrigerant including fluoromethane and pentafluoroethane, as with the R410A refrigerant, although the mixture ratio of difluoromethane, pentafluoroethane, and 2,3,3,3-Tetrafluoro-1-propene changes, and, compared with when the second refrigerant that does not include difluoromethane and pentafluoroethane is completed with respect to the R410A refrigerant, the parts of the already installed refrigeration cycle apparatus 1 other than the heat source unit are suitable for the refrigerant. As a result, even when the R452B refrigerant, which differs from the R410A refrigerant that is the recovered refrigerant, is charged, the operation of the refrigeration cycle apparatus 1 is easily kept normal.

(4-4)

As described in the aforementioned modification 1C, the first refrigerant and the second refrigerant may be the R410A refrigerant and the R454B refrigerant, respectively. In this case, of the already installed refrigeration cycle apparatus 1 that has been operated with the R410A refrigerant, parts other than the heat source unit are normally compatible with the R454B refrigerant, which is an alternative refrigerant of the R410A refrigerant. Even when the R454B, which is the second refrigerant, is supplemented, the refrigerant is still the mixed refrigerant including fluoromethane and pentafluoroethane, as with the R410A refrigerant, although the mixture ratio of difluoromethane, pentafluoroethane, 2,3,3,3-tetrafluoro-1-propene changes, and, compared with when the second refrigerant that does not include difluoromethane and pentafluoroethane is completed with respect to the R410A refrigerant, the parts of the already installed refrigeration cycle apparatus 1 other than the heat source unit are suitable for the refrigerant. As a result, even when the R452B refrigerant, which differs from the R410A refrigerant that is the recovered refrigerant, is charged, the operation of the refrigeration cycle apparatus 1 is easily kept normal.

(4-5)

As described in the aforementioned modification 1J, when, after the nitrogen gas is packed in the second heat source unit 10B, the second heat source unit 10B with the nitrogen gas packed in the second heat source unit 10B is to be transported to the rooftop of the building 200, which is the installation location of the already installed refrigeration cycle apparatus 1, outside air is obstructed by the nitrogen gas from entering the second heat source unit 10B during transport. As a result, it is possible to suppress a foreign material, moisture, and the like from mixing with outside air and entering the second heat source unit 10B during transport.

(4-6)

As described in the aforementioned modification 1K, when, after the R32 refrigerant in a prescribed pressure range is packed in the second heat source unit 10B, the second heat source unit 10B with the R32 refrigerant packed in the second heat source unit 10B is to be transported to the rooftop of the building 200, which is the installation location of the already installed refrigeration cycle apparatus 1, outside air is obstructed by the R32 refrigerant from entering the second heat source unit 10B during transport since the R32 refrigerant is packed in the second heat source unit 10B that is transported to the installation location, and it is thus possible to suppress a foreign material, moisture, and the like from mixing with outside air and entering the second heat source unit 10B during transport. Moreover, there is no need to extract the R32 refrigerant when connecting the second heat source unit 10B to the already installed refrigeration cycle apparatus 1, and therefore, time and labor in charging work are saved.

(4-7)

As described in the aforementioned modification 1L, in judgement that the mixed refrigerant, which is the mixture of the recovered refrigerant and the second refrigerant, is non-flammable and/or flammable, when the refrigeration cycle apparatus 1 after renewal is only compatible with a non-flammable refrigerant or not compatible with a flammable refrigerant, it is possible to take a measure of selecting non-utilization of the mixed refrigerant for the refrigeration cycle apparatus 1 after renewal or modifying the refrigeration cycle apparatus 1 after renewal so as to be, for example, compatible with a flammable refrigerant, and it is possible to keep the operation of the refrigeration cycle apparatus 1 normal.

(4-8)

As illustrated in FIG. 4, the refrigerant charging method can be configured to include the step S6. In the step S6, the mixture ratio of the recovered refrigerant and the second refrigerant charged in the second heat source unit 10B is stored in the memory 45 of the second heat source unit 10B, and/or the mixture ratio is displayed on the display device 47 of the second heat source unit 10B. For example, an operator can correctly grasp the composition of the refrigerant of the second heat source unit 10B from information of the mixture ratio stored in the memory 45 and/or the mixture ratio displayed on the display device 47. As a result, the operator can regulate the refrigeration cycle apparatus 1 on the basis of the grasped composition of the refrigerant and can operate the refrigeration cycle apparatus 1 correctly.

(5) Another Aspect

The refrigerant charging method described above also can be comprehended from the following aspect.

When the refrigeration cycle apparatus is to be renewed, a refrigerant recovered at a local site may be considered to be used in a refrigeration cycle apparatus after renewal at the local site. When a refrigerant recovered at a local site is to be charged to and used in a refrigeration cycle apparatus after renewal, there is a possibility of occurrence of a situation in which the recovered refrigerant is not sufficiently proper for the refrigeration cycle apparatus after renewal as a result of the recovered refrigerant recovered at the local site being utilized and the configuration of the refrigeration cycle apparatus after renewal being changed.

In consideration of the above, it can be said that, when a recovered refrigerant is utilized in a refrigeration cycle apparatus after renewal, there is a problem of correctly operating the refrigeration cycle apparatus in which the recovered refrigerant is charged.

To solve such a problem, it is sufficient for the refrigerant charging method to be a refrigerant charging method used when the first heat source unit 10A of the already installed refrigeration cycle apparatus 1 in which a refrigeration cycle is to be performed by a refrigerant that circulates is to be replaced with the second heat source unit 10B, and to include a step of recovering a first refrigerant from the already installed refrigeration cycle apparatus and obtaining a recovered refrigerant and a step of charging the recovered refrigerant and charging a second refrigerant whose composition differs from that of the recovered refrigerant to the refrigeration cycle apparatus after renewal including the second heat source unit.

In such a refrigerant charging method, it is possible in refrigerant charging with respect to the refrigeration cycle apparatus 1 to charge a recovered refrigerant obtained by recovering a first refrigerant from the already installed refrigeration cycle apparatus 1 and a second refrigerant to the refrigeration cycle apparatus 1 after renewal. As a result, it is possible to correctly operate the refrigeration cycle apparatus 1 by supplementing a lacking amount of the recovered refrigerant with the second refrigerant.

An embodiment of the present disclosure has been described above; however, it should be understood that various changes in the forms and details are possible without deviating from the gist and the scope of the present disclosure described in the claims.

REFERENCE SIGNS LIST

1 refrigeration cycle apparatus
10 heat source unit
10A first heat source unit
10B second heat source unit

CITATION LIST

Patent Literature

PTL 1: Japanese Unexamined Patent Application Publication No. 2003-240388

The invention claimed is:

1. A refrigerant charging method of recovering a refrigerant and charging the refrigerant to a second heat source unit, the refrigerant being included in a first heat source unit of an already installed refrigeration cycle apparatus in which a refrigeration cycle is to be performed by the refrigerant that circulates, the method comprising:
   recovering a first refrigerant from the already installed refrigeration cycle apparatus and obtaining a recovered refrigerant; and
   charging the recovered refrigerant and further charging a second refrigerant whose composition differs from a composition of the recovered refrigerant to the refrigeration cycle apparatus that includes the second heat source unit.

2. The refrigerant charging method according to claim 1, wherein the first refrigerant is an R410A refrigerant, and the second refrigerant is an R32 refrigerant.

3. The refrigerant charging method according to claim 1, wherein the first refrigerant is an R410A refrigerant, and the second refrigerant is an R452B refrigerant.

4. The refrigerant charging method according to claim 1, wherein the first refrigerant is an R410A refrigerant, and the second refrigerant is an R454B refrigerant.

5. The refrigerant charging method according to claim 1, further comprising:
   after packing a nitrogen gas in the second heat source unit, transporting the second heat source unit with the nitrogen gas packed in the second heat source unit to an installation location of the already installed refrigeration cycle apparatus.

6. The refrigerant charging method according to claim 1, further comprising:
   after packing an R32 in a prescribed pressure range in the second heat source unit, transporting the second heat source unit with the R32 packed in the second heat source unit to an installation location of the already installed refrigeration cycle apparatus.

7. The refrigerant charging method according to claim 1, further comprising:
   when a recovered refrigerant and the second refrigerant are mixed together through charging to the refrigeration cycle apparatus including the second heat source unit and become a mixed refrigerant, judging whether the mixed refrigerant is non-flammable and/or judging whether the mixed refrigerant is flammable.

8. The refrigerant charging method according to claim 1, comprising:
    causing the second heat source unit to store a mixture ratio of the recovered refrigerant and the second refrigerant charged in the second heat source unit and/or causing the second heat source unit to display the mixture ratio.

9. The refrigerant charging method according to claim 2, further comprising:
    after packing a nitrogen gas in the second heat source unit, transporting the second heat source unit with the nitrogen gas packed in the second heat source unit to an installation location of the already installed refrigeration cycle apparatus.

10. The refrigerant charging method according to claim 3, further comprising:
    after packing a nitrogen gas in the second heat source unit, transporting the second heat source unit with the nitrogen gas packed in the second heat source unit to an installation location of the already installed refrigeration cycle apparatus.

11. The refrigerant charging method according to claim 4, further comprising:
    after packing a nitrogen gas in the second heat source unit, transporting the second heat source unit with the nitrogen gas packed in the second heat source unit to an installation location of the already installed refrigeration cycle apparatus.

12. The refrigerant charging method according to claim 2, further comprising:
    after packing an R32 in a prescribed pressure range in the second heat source unit, transporting the second heat source unit with the R32 packed in the second heat source unit to an installation location of the already installed refrigeration cycle apparatus.

13. The refrigerant charging method according to claim 3, further comprising:
    after packing an R32 in a prescribed pressure range in the second heat source unit, transporting the second heat source unit with the R32 packed in the second heat source unit to an installation location of the already installed refrigeration cycle apparatus.

14. The refrigerant charging method according to claim 4, further comprising:
    after packing an R32 in a prescribed pressure range in the second heat source unit, transporting the second heat source unit with the R32 packed in the second heat source unit to an installation location of the already installed refrigeration cycle apparatus.

15. The refrigerant charging method according to claim 2, further comprising:
    when a recovered refrigerant and the second refrigerant are mixed together through charging to the refrigeration cycle apparatus including the second heat source unit and become a mixed refrigerant, judging whether the mixed refrigerant is non-flammable and/or judging whether the mixed refrigerant is flammable.

16. The refrigerant charging method according to claim 3, further comprising:
    when a recovered refrigerant and the second refrigerant are mixed together through charging to the refrigeration cycle apparatus including the second heat source unit and become a mixed refrigerant, judging whether the mixed refrigerant is non-flammable and/or judging whether the mixed refrigerant is flammable.

17. The refrigerant charging method according to claim 4, further comprising:
    when a recovered refrigerant and the second refrigerant are mixed together through charging to the refrigeration cycle apparatus including the second heat source unit and become a mixed refrigerant, judging whether the mixed refrigerant is non-flammable and/or judging whether the mixed refrigerant is flammable.

18. The refrigerant charging method according to claim 5, further comprising:
    when a recovered refrigerant and the second refrigerant are mixed together through charging to the refrigeration cycle apparatus including the second heat source unit and become a mixed refrigerant, judging whether the mixed refrigerant is non-flammable and/or judging whether the mixed refrigerant is flammable.

19. The refrigerant charging method according to claim 6, further comprising:
    when a recovered refrigerant and the second refrigerant are mixed together through charging to the refrigeration cycle apparatus including the second heat source unit and become a mixed refrigerant, judging whether the mixed refrigerant is non-flammable and/or judging whether the mixed refrigerant is flammable.

20. The refrigerant charging method according to claim 2, comprising:
    causing the second heat source unit to store a mixture ratio of the recovered refrigerant and the second refrigerant charged in the second heat source unit and/or causing the second heat source unit to display the mixture ratio.

* * * * *